(12) United States Patent
Okada et al.

(10) Patent No.: US 6,480,242 B1
(45) Date of Patent: Nov. 12, 2002

(54) IMAGE DISPLAY CORRECTING SYSTEM, IMAGE DISPLAY CORRECTING APPARATUS AND METHOD, AND IMAGE DISPLAY APPARATUS AND METHOD

(75) Inventors: Masamichi Okada, Kanagawa (JP); Yasunobu Kato, Kanagawa (JP); Hiromu Hosokawa, Chiba (JP); Yoshio Takayanagi, Saitama (JP); Takahiro Inoue, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/384,204

(22) Filed: Aug. 27, 1999

(30) Foreign Application Priority Data

Aug. 28, 1998 (JP) .......................... 10-243470
Jan. 26, 1999 (JP) .......................... 11-017572

(51) Int. Cl.⁷ .................................. H04N 9/28
(52) U.S. Cl. .................. 348/807; 315/368.11
(58) Field of Search .................. 348/745–747, 348/806, 807, 808, 181, 189, 190, 191, 615, 616; 315/368.11, 368.12, 368.13, 368.18; H04N 9/28, 9/31

(56) References Cited

U.S. PATENT DOCUMENTS

| | | |
|---|---|---|
| 5,091,773 A | 2/1992 | Fouche |
| 5,276,519 A | 1/1994 | Richards |
| 5,465,121 A | 11/1995 | Blalock |
| 5,475,447 A * | 12/1995 | Funado ................... 348/745 |
| 5,592,240 A * | 1/1997 | Sakamoto et al. ........ 348/807 |
| 5,671,025 A * | 9/1997 | Ryu ......................... 348/745 |

FOREIGN PATENT DOCUMENTS

| | | |
|---|---|---|
| CA | 2141160 | 7/1995 |
| EP | 0498659 A2 | 8/1992 |
| EP | 0665695 | 8/1995 |
| JP | 55-163988 | 12/1980 |
| JP | 05-328370 | 12/1993 |
| JP | 06-269014 | 9/1994 |
| JP | 07-212779 | 8/1995 |
| WO | WO9934394 | 7/1999 |

* cited by examiner

Primary Examiner—Michael H. Lee
(74) Attorney, Agent, or Firm—Rader, Fishman & Grauer PLLC; Ronald P. Kananen, Esq.

(57) ABSTRACT

An image display correcting apparatus of the invention comprises, broadly, a correction data forming apparatus and an image display apparatus. Correction data for correcting a display state of an image is formed by the correction data forming apparatus on the basis of an image as a reference displayed on the screen of a CRT. Further, on the basis of the correction data, an operation of correcting image data is executed so that an image is accurately displayed on the image display apparatus. The corrected image data is outputted to the CRT. Thus, a defective display state such as image distortion, misconvergence, or the like can be corrected at low cost and a high quality image can be displayed.

20 Claims, 14 Drawing Sheets

IMAGE DISPLAY CORRECTING SYSTEM, IMAGE DISPLAY CORRECTING APPARATUS AND METHOD, AND IMAGE DISPLAY APPARATUS AND METHOD

BACKGROUND OF THE INVENTION

1. Field of the Invention

The present invention relates to an image display correcting system and image display correcting apparatus and method for correcting a display state such as distortion of a displayed image, and image display apparatus and method for displaying the corrected image.

2. Description of the Related Art

In an image display apparatus such as a television receiver or a monitor apparatus for a computer, a CRT (cathode ray tube) is widely used. In the CRT, an electron beam is emitted from an electron gun and the electron beam is deflected by a magnetic field or an electric field for deflection applied from the outside, thereby displaying an image.

FIG. 1 is a diagram showing a display screen of an image display apparatus using the CRT. In the CRT, an electron beam emitted from an electron gun is deflected both in the vertical and in the horizontal directions by a deflector using a deflecting coil and a scanned image called a raster is displayed on a display surface S (screen). The electron beam is deflected by scan signals having sawtooth waveforms. Denote the deflection center point of the electron beam by O, and the center point of the screen by $O_S$. Then, the distance l from the deflection center point O to a scan position of the electron beam on the display surface S can be given by $r \cdot \tan\theta$ in which r is the distance from the deflection center point O to the display face S (distance from the deflection center point O to the screen center point $O_S$) and $\theta$, is the deflection angle of the electron beam. The distance lv from the center point $O_S$ of the screen to an end of the screen in the vertical direction is given by $r \cdot \tan\theta v$, in which $\theta v$ is the maximum deflection angle in the vertical direction of the screen. Therefore, the size Lv in the vertical direction of the screen can be given by $2lv = 2r \cdot \tan\theta v$.

FIGS. 2A and 2B and FIGS. 3A and 3B are diagrams for describing an image displayed on the CRT more specifically. Since the screen of the CRT has generally a rectangular shape, the emission length of the electron beam reaching each of the four corners of the screen of the CRT is the longest. Consequently, an image displayed on the screen usually looks distorted in a bobbin shape. The distortion of the image (hereinafter, called an "image distortion") can be expressed as a difference between an image inputted as an image signal (image to be displayed) and an image actually displayed on the screen of the CRT. FIG. 2A shows an image to be displayed and FIG. 2B illustrates a distorted image actually displayed on the screen (part shown by solid lines). In FIG. 2B, the part shown by broken lines denotes an image to be displayed.

In case of displaying a color image, electron beams for three colors (for example, R (red), G (green), and B (blue)) as the base of the color display are used. There is a case in which the electron beam for each color is influenced by a magnetic field which is different according to color and the electron beams for respective colors do not converge on the same spot. In order to reproduce input signals on the screen of the CRT, however, the electron beams for respective colors have to converge on the same point on the screen. A phenomenon in which the positions of the electron beams for the three colors on the screen are deviated when the electron beams are deflected by a deflecting yoke is called misconvergence. FIG. 3A shows an image to be displayed and FIG. 3B shows an image accompanied by misconvergence which is actually displayed on the screen. FIGS. 3A and 3B illustrate a case of the misconvergence when a cross hatch signal of white is displayed on the CRT. In FIG. 3B, parts shown by reference numerals 100R, 100G, and 100B represent images of the colors of R, G, and B, respectively. There is a case in which a distortion of the electron beam such as image distortion and misconvergence influenced by the magnetic field is, although not much, influenced by earth magnetism and arrangement of components in the apparatus.

The occurrence of the image distortion is conventionally minimized by optimizing the deflecting magnetic field generated by the deflecting yoke. In recent years, however, in association with the wider angle of the screen of a video display apparatus, a flat screen of the CRT, changes in the permissible level of the image distortion demanded by the market, the image distortion cannot be corrected with sufficient performance only by optimizing the deflecting magnetic field generated by the deflecting yoke. There are several methods of correcting the image distortion of an amount which has not been corrected by the deflecting magnetic field: one is to modulate a deflecting current passed to the deflecting yoke, and another is to modulate a signal supplied to the cathode of the electron gun. The method of modulating the deflecting current, however, requires an additional circuit for the modulation and this causes a problem of cost increase. Although a cheap circuit may be used in order to reduce the cost, there is another problem that it is difficult to perform accurate correction with a cheap circuit. With the method of modulating the signal supplied to the cathode of the electron gun, the image distortion in the same scan line, that is, in the lateral direction can be corrected, however, it is difficult to correct the image distortion in the vertical direction.

As for the correction of the misconvergence as well, basically in a manner similar to the correction of the image distortion, the electron beams of the three colors are designed to converge to the same spot with respect to the whole screen on the basis of a distribution of deflecting magnetic fields generated by the deflecting yoke. In a manner similar to the correction of the image distortion, it is difficult to perfectly correct the misconvergence by using only the distribution of the magnetic fields of the deflecting yoke. A method adopted in the related art in order to correct the misconvergence of an amount which has not been corrected in the above-mentioned manner is to converge the electron beams accurately by adding a subyoke for correction independent of the originally used deflecting yoke, and to move the electron beams for the respective colors color by color. This method, however, requires a circuit for driving the subyoke as well as the subyoke itself thus increase in resulting in the manufacturing cost.

As described above, the method of correcting the image distortion and the misconvergence by optimizing the deflecting magnetic field has been generally used in the related art. Since it is necessary to repeatedly spread the image to the whole screen in each of the horizontal and vertical directions in order to adjust the correction by the deflecting magnetic field, there are problems of the low efficiency of the work and the variation according to the adjusting persons. Therefore it is not always possible to perform optimum adjustment of the image distortion. Additional components such as a complicated deflecting coil and an adjusting mechanism make the cost of the apparatus even higher.

When image distortion and misconvergence are reduced by using the deflecting yoke, it is necessary to forcibly distort the deflecting magnetic field, so that the magnetic fields become non-uniform. In the related art, there is a problem that focusing characteristics (spot size and the like) of the electron beam deteriorate due to the distorted magnetic field, thus causing deterioration in resolution. Further, in order to correct the image distortion and the misconvergence by the deflecting yoke, a period of developing and designing the deflecting yoke is necessary. This also causes a cost increase.

In the method of adjusting the image distortion and the misconvergence, which is performed when a television receiver of a related art is manufactured, the correction amount is not so large. Therefore it is necessary to suppress variations in the assembly of the CRT and the deflecting yoke in order to suppress the image distortion and the misconvergence which are caused by variations in manufacturing of the CRT and the deflecting yoke to a certain degree. Since the image distortion and the misconvergence are also caused by the manufacturing variations of the CRT and the deflecting yoke in the image display apparatus of the related art, the CRT and the deflecting yoke have to be assembled with high accuracy, thereby incurring the high manufacturing cost.

SUMMARY OF THE INVENTION

The invention has been achieved in consideration of the problems. The object is to provide an image display correcting system, image display correcting apparatus and method, and image display apparatus and method capable of displaying a high-quality image by correcting a defective display state, such as an image distortion, at a low cost.

An image display correcting apparatus comprises: correction data memory for storing correction data for correcting a display state of an image, obtained on the basis of an image displayed on a screen; and calculating means for performing an operation of correcting inputted image data on the basis of the correction data stored in the correction data memory so that an image is properly displayed and outputting the corrected image data as image data for display.

An image display correcting method comprises: a step of storing correction data for correcting a display state of an image, obtained based on an image displayed on a screen; and a step of executing an operation of correcting inputted image data on the basis of the correction data stored in the storing step so that the image is properly displayed and outputting corrected image data as image data for display.

An image display apparatus comprises: a correction data memory for storing correction data for correcting a display state of an image, obtained based on an image displayed on a screen; calculating means for executing an operation of correcting inputted image data on the basis of the correction data stored in the correction data memory so that an image is properly displayed and outputting the corrected image data as image data for display; and image display means for displaying an image on the basis of the image data for display outputted from the calculating means.

An image display method comprises: a step of storing correction data for correcting a display state of an image, obtained based on an image displayed on a screen; a step of executing an operation of correcting inputted image data on the basis of the correction data stored in the storing step so that an image is properly displayed and outputting the corrected image data as image data for display; and a step of displaying an image on the basis of the image data for display outputted in the calculating step.

An image display correcting system comprises an image display apparatus for displaying an image and a correction data forming apparatus for forming correction data for correcting an image displayed on the image display apparatus, wherein the correction data forming apparatus includes: an image pickup device for obtaining an image displayed on a screen of the image display apparatus; and an image distortion data calculating unit for forming correction data to correct a display state of an image, on the basis of the image obtained by the image pickup apparatus, and the image display apparatus includes: a correction data memory for storing correction data formed by the correction data forming apparatus; calculating means for executing an operation of correcting inputted image data on the basis of the correction data stored in the correction data memory so that an image is properly displayed and outputting the corrected image data as image data for display, and image display means for displaying an image on the basis of the image data for display outputted from the calculating means.

In an image display correcting apparatus and method according to the invention, a correcting operation is performed on inputted image data on the basis of correction data for correcting a display state of an image, obtained based on an image displayed on a screen so that an image is properly displayed, and the corrected image data is outputted as image data for display.

In an image display apparatus and method according to the invention, a correcting operation is performed on inputted image data on the basis of correction data for correcting a display state of an image, obtained based on an image displayed on a screen so that an image is properly displayed and, the corrected image data is outputted as image data for display. An image is displayed on the basis of the outputted image data for display.

In an image display correcting system according to the invention, an image displayed on the screen of the image display apparatus is obtained by the correction data forming apparatus and correction data for correcting a display state of the image is formed on the basis of the obtained image. By the image display apparatus, a correcting operation is performed on inputted image data on the basis of the correction data formed by the correction data forming apparatus so that an image is properly displayed, and the corrected image data is outputted as image data for display. Then an image is displayed on the basis of the outputted image data for display.

Other and further objects, features and advantages of the invention will appear more fully from the following description.

BRIEF DESCRIPTION OF THE DRAWINGS

FIG. 7 is a diagram showing a deviation of a display position of a pixel due to image distortion or the like.

DETAILED DESCRIPTION OF THE PREFERRED EMBODIMENTS

Preferred embodiments of the invention will now be described in detail with reference to the accompanying drawings.

First Embodiment

Figure 1:
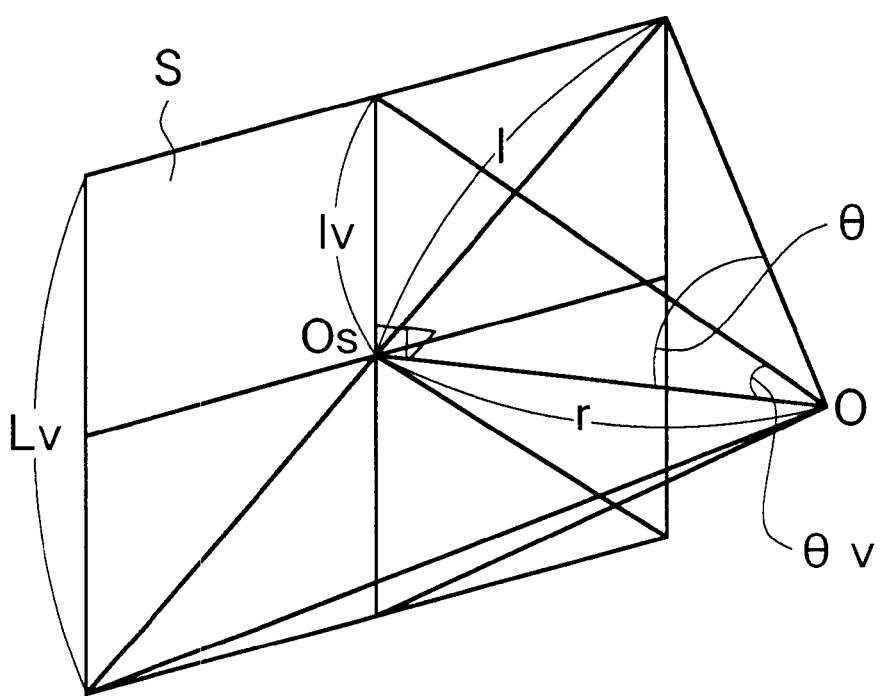
FIG. 1 is a diagram for explaining a display screen of an image display apparatus using a CRT.
Figure 2A:
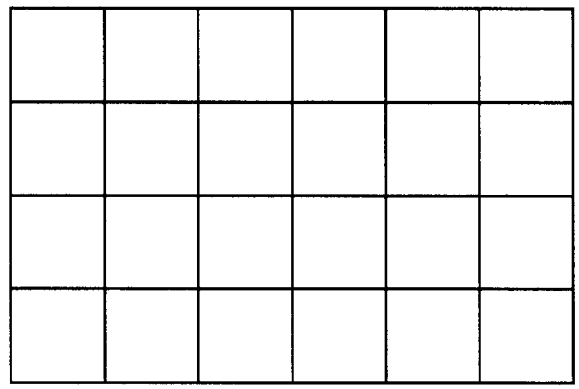
FIG. 2A is a diagram showing an image to be displayed on the CRT.
Figure 2B:
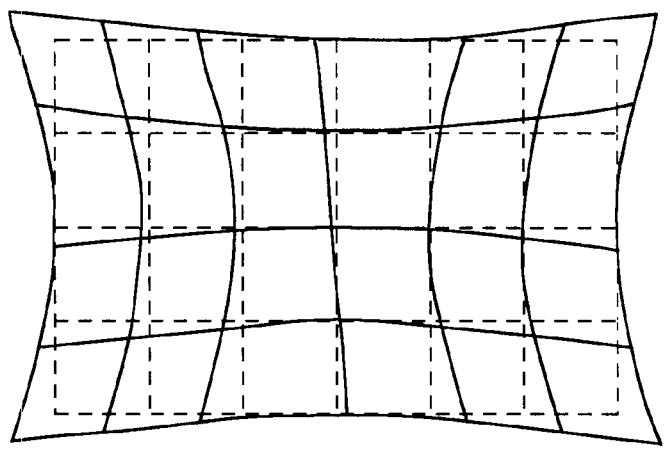
FIG. 2B is a diagram showing an image accompanied by distortion displayed on the CRT.
Figure 3A:
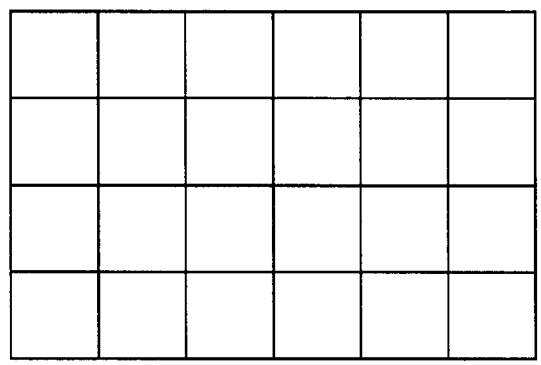
FIG. 3A is a diagram showing an image to be displayed on the CRT.
Figure 3B:
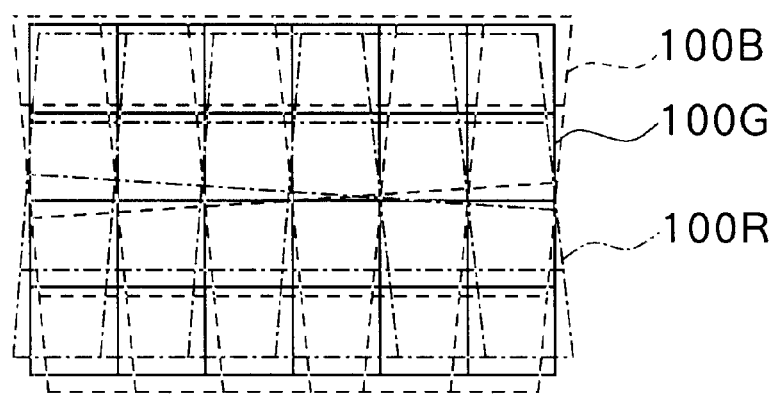
FIG. 3B is a diagram showing an image accompanied by misconvergence displayed on the CRT.
Figure 4:
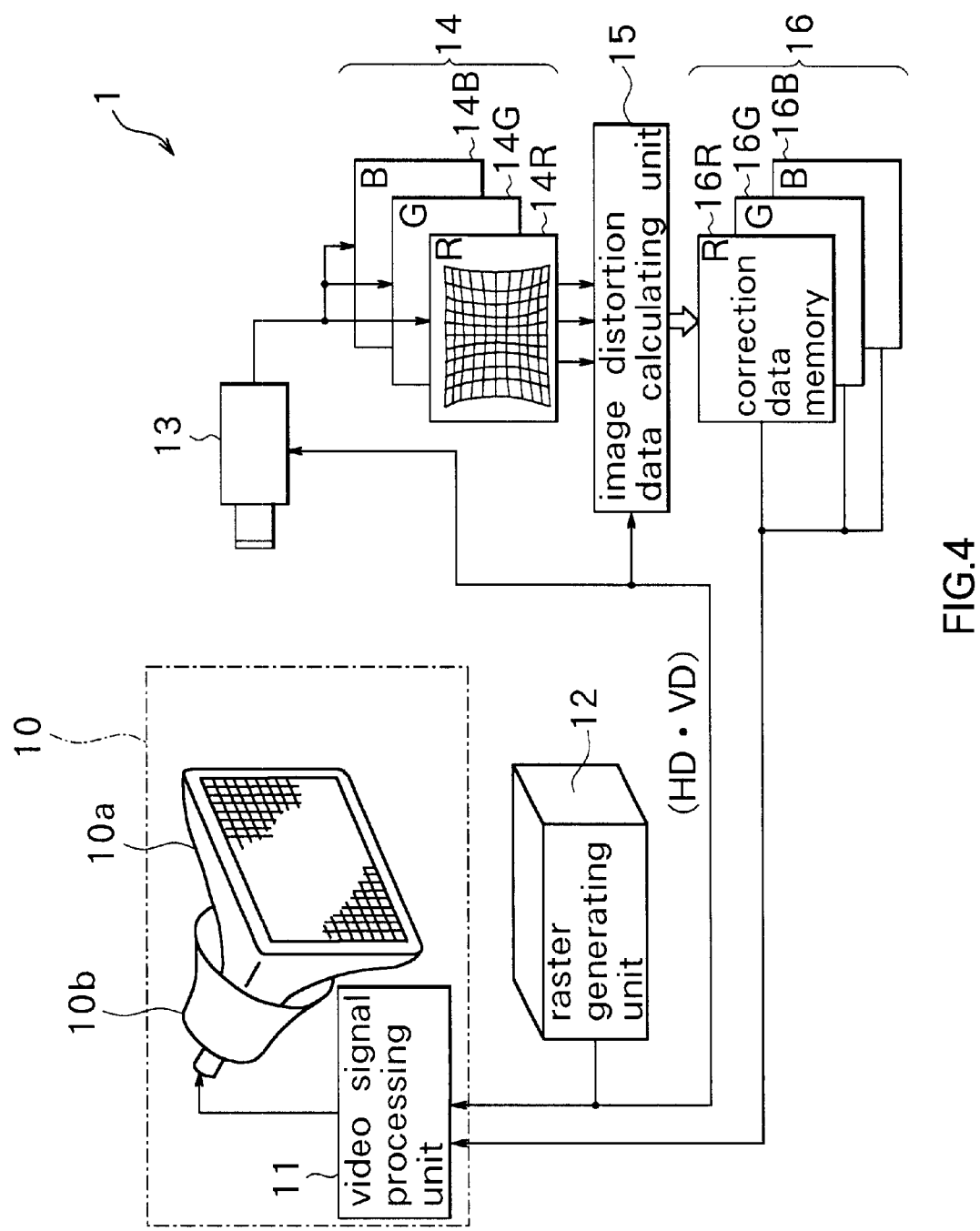
FIG. 4 is a diagram showing a schematic construction of an image display correcting system according to the invention.

FIG. 4 is a diagram showing a schematic construction of an image display correcting system according to the invention. The image display correcting system comprises: an image display apparatus 10 for displaying an image; and a correction data forming apparatus 1 for forming correction data used to correct an image displayed on the image display apparatus 10. The correction data forming apparatus 1 and the image display apparatus 10 are under the control of a control apparatus (not shown). The control apparatus takes the form of, for example, a microcomputer. The correction data formed by the correction data forming apparatus 1 is obtained by measuring an image distortion amount, a misconvergence amount, or the like of an image displayed on the image display apparatus 10. In the system according to the form of the first execution, the correction data formed by the correction data forming apparatus 1 is automatically written into the image display apparatus 10 side. On the image display apparatus 10 side, a defective display state such as image distortion or misconvergence is corrected on the basis of the correction data.

The image display apparatus 10 is subject to the correction of the display state of an image such as distortion. The image display apparatus 10 comprises: a CRT 10a in which a color image according to image signals supplied can be displayed on the screen; a deflector 10b for deflecting electron beams for scanning generated by the CRT 10a; and a video signal processing unit 11 for performing various signal processes on the inputted color image signal and supplying the resultant signal to the CRT 10a. The CRT 10a has, although not shown, an electron gun for generating an electron beam and the like. The deflector 10b has a deflecting coil and the like. In the CRT 10a, an electron beam emitted from the electron gun is deflected both in the vertical and in the horizontal directions by the deflector 10b to display a scan image called raster on the display face (screen). The detailed construction of the video signal processing unit 11 will be described hereinlater with reference to FIG. 5. The CRT 10a corresponds to "image display means" in an example of the invention.

The correction data forming apparatus 1 comprises: a raster generating unit 12 for supplying a raster signal (image signal) including a reference signal, a horizontal synchronization signal HD, and a vertical synchronization signal VD to create a predetermined raster image on the image display apparatus 10; an image pickup apparatus 13 including, for example, an image pickup device such as CCD (Charge Coupled Device), for obtaining the image displayed on the CRT 10a of the image display apparatus 10 and outputting the image data; a frame memory 14 for storing the image data outputted from the image pickup apparatus 13 on a frame unit basis; an image distortion data calculating unit 15 for forming correction data to correct image distortion or the like on the basis of the image data stored in the frame memory 14; and a correction data memory 16 for storing the correction data created by the image distortion data calculating unit 15. The frame memory 14 is a dual type memory to/from which data can be written/read and has a frame memory 14R for red, a frame memory 14G for green, and a frame memory 14B for blue. The correction data memory 16 has a correction data memory 16R for red, a correction data memory 16G for green, and a correction data memory 16B for blue.

The raster generating unit 12 supplies reference image signals serving as a reference for correction which include signals for R, G, and B colors. In accordance with the reference image signal, an image as a reference for correction is displayed on the screen of the CRT 10a of the image display apparatus 10. As a reference raster image, a dot pattern or a cross hatch pattern can be used. It is preferable that the reference image signal be also supplied to the image pickup apparatus 13 and the image distortion data calculating unit 15.

The image pickup apparatus 13 obtains an image displayed on the screen of the CRT 10a in each of the R, G, and B colors and outputs the obtained image as image data color by color. In the frame memory 14, the image data of R, G, and B outputted from the image pickup apparatus 13 is stored into the frame memories 14R for R, the frame memory 14G for G, and the frame memory 14B for B, respectively. In place of the frame memory 14, storing means of other specifications such as a memory to which image data can be stored at least on a field unit basis may be used.

The image distortion data calculating unit 15 determines the address (coordinates) position on the frame memory 14 corresponding to a picture plane having no distortion, to which the position of each pixel in a distorted image displayed on the screen of the CRT 10a corresponds, obtains correction data from data related to both of the address information, and stores the obtained correction data color by color into the correction data memory 16. The image distortion data calculating unit 15 takes the form of, for example, a microcomputer. The correction data stored in the correction data memory 16 is supplied to the video signal processing unit 11 in the image display apparatus 10. The correction data obtained by the image distortion data calculating unit 15 is data regarding a movement amount from a proper display position of each pixel in two-dimensional digitized image data showing an image displayed on the screen of the CRT 10a.

The frame memory 14 may be omitted from the system configuration when a clock for specifying a timing at which image data in the image pickup apparatus 13 is outputted and a clock supplied to the image distortion data calculating unit 15 are synchronized. In this case, for example, by supplying a sync signal of the image signal as a reference for correction supplied to the image display apparatus 10 as a sync signal to the image distortion data calculating unit 15, the two clocks can be made synchronous.

Figure 5:
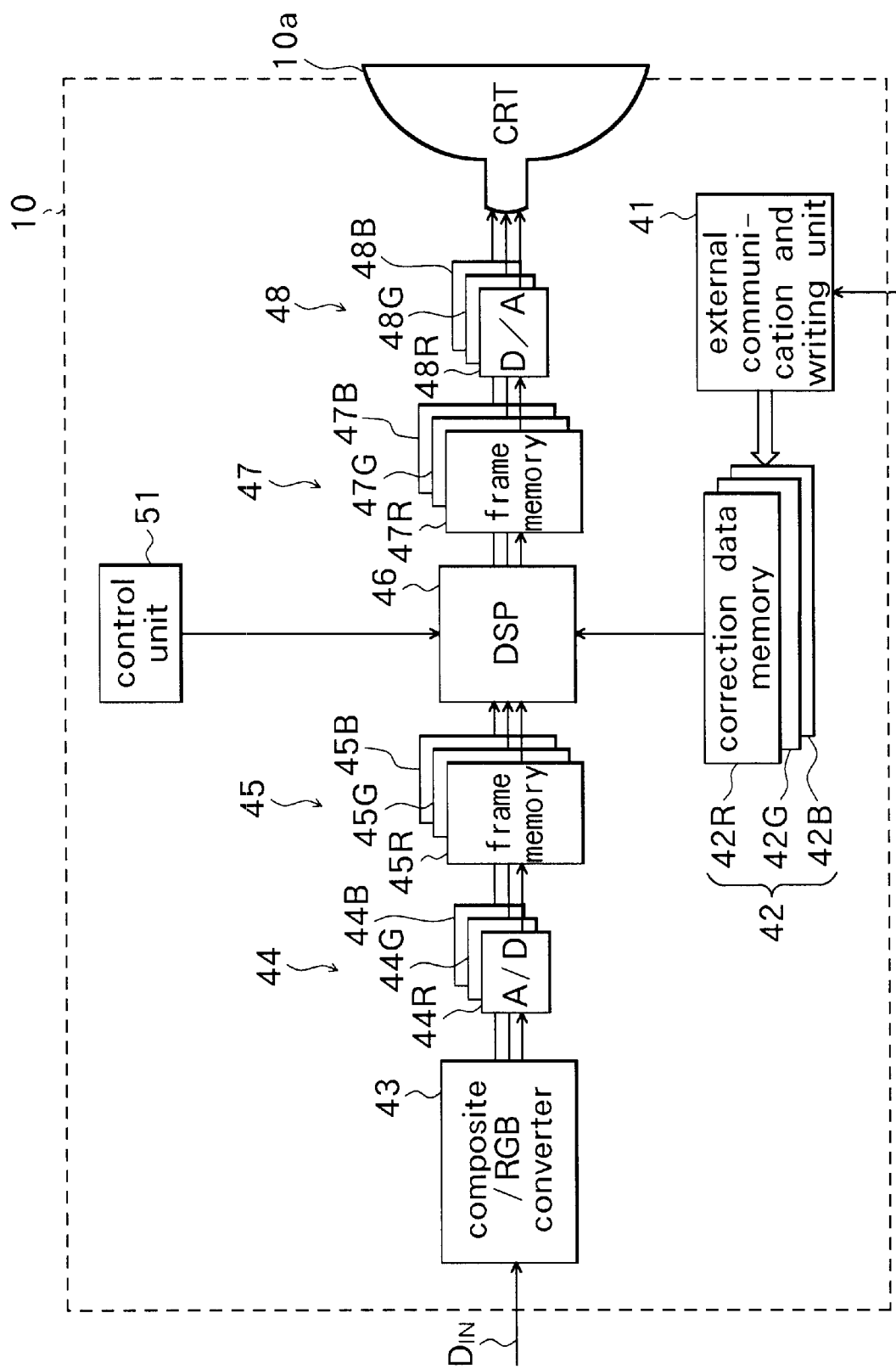
FIG. 5 is a block diagram specifically showing an image display apparatus according to the invention.

FIG. 5 is a block diagram specifically showing the image display apparatus 10 according to the invention. The diagram shows an example of a circuit for receiving an analog composite signal in the NTSC (National Television System Committee) system as an input signal $D_{IN}$ and displaying a motion image according to the signal. In the diagram, only a circuit part related to the invention is shown and the other processing circuit is omitted. As shown FIGS. 4 and 5, the video signal processing unit 11 comprises: a correction data memory 42 (42R, 42G, 42B) for storing the correction data of each color formed by the correction data forming apparatus 1; an external communication and writing unit 41 for communicating with the correction data forming apparatus 1 as an external apparatus and writing the correction data formed by the correction data forming apparatus 1 into the correction data memory 42; a composite/RGB converter 43 for converting the analog composite signal inputted as an input signal $D_{IN}$ into a signal of R, G, or B; an analog/digital signal (hereinafter, referred to as "A/D") converter 44 (44R, 44G, 44B) for converting an analog signal for each color outputted from the composite/RGB converter 43 into a digital signal and outputting the digital signal; and a frame memory 45 (45R, 45G, 45B) for storing the digital signal of each color outputted from the A/D converter 44 on a frame unit basis.

The video signal processing unit 11 further comprises a DSP (Digital Signal Processor) circuit 46 for performing various calculating processes on image data of each color stored in the frame memory 45 and outputting the calculated data color by color; a frame memory 47 (47R, 47G, 47B) for storing the calculated image data outputted from the DSP circuit 46 color by color on the frame unit basis; a digital/analog signal (hereinafter, referred to as "D/A") converter 48 (48R, 48G, 48B) for converting the image data stored in the frame memory 47 into an analog signal and outputting the analog signal to the CRT 10a; and a control unit 51 for instructing the calculating method to the DSP circuit 46. The frame memories 44 and 47 are dual type memories to/from which data can be written/read.

The DSP circuit 46 corresponds to "calculating means" in an example of the invention.

The DSP circuit 46 takes the form of, for example, a general one-chip LSI. For example, the DSP circuit 46 performs the calculating process to correct the image distortion or misconvergence on the image data of each color stored in the frame memory 45 by using the correction data stored in the correction data memory 42 in accordance with an instruction of the control unit 51. The calculating process for correcting the image distortion or misconvergence will be described in detail hereinlater with reference to the drawings.

The operation of the image display correcting system having the above-mentioned construction will now be described.

The operation of the whole system will be first briefly described with reference to FIGS. 4 and 5. Prior to the correction of the image display by using correction data, on the image display apparatus 10 side, the landing of the electron beam is adjusted to a certain extent so as to obtain desired accuracy. After that, the screen size, display position, and the like are adjusted in advance so as to display an image of a predetermined size. Then, the reference image signals for correction including signals of R, G, and B colors are supplied from the raster generating unit 12. The image display apparatus 10 displays a color image on the screen of the CRT 10a in accordance with the reference image signals supplied from the raster generating unit 12. The image displayed according to the reference image signal is, for example, a dot pattern or a grid pattern.

The raster image as a reference for correction in the R, G, and B colors displayed on the screen of the CRT 10a is obtained by the image pickup apparatus 13 and the obtained image data is stored into the frame memory 14 on the frame unit basis. The image data stored in the frame memory 14 is supplied to the image distortion data calculating unit 15. The image distortion calculating unit 15 determines the address position on the frame memory 14 corresponding to the image having no distortion, to which the position of each pixel in a distorted image on the screen of the CRT 10a corresponds, forms the correction data from the data related to both of the address information, and stores the correction data into the correction data memory 16.

The correction data stored in the correction data memory 16 on the correction data forming apparatus 1 side is transmitted to the image display apparatus 10. On the image display apparatus 10 side, the correction data transmitted from the correction data forming apparatus 1 side is written into the correction data memory 42 by the external communication and writing unit 41 (FIG. 5). On the image display apparatus 10 side, a defective display state such as image distortion or misconvergence is corrected on the basis of the correction data and the corrected image is displayed.

Figure 6:
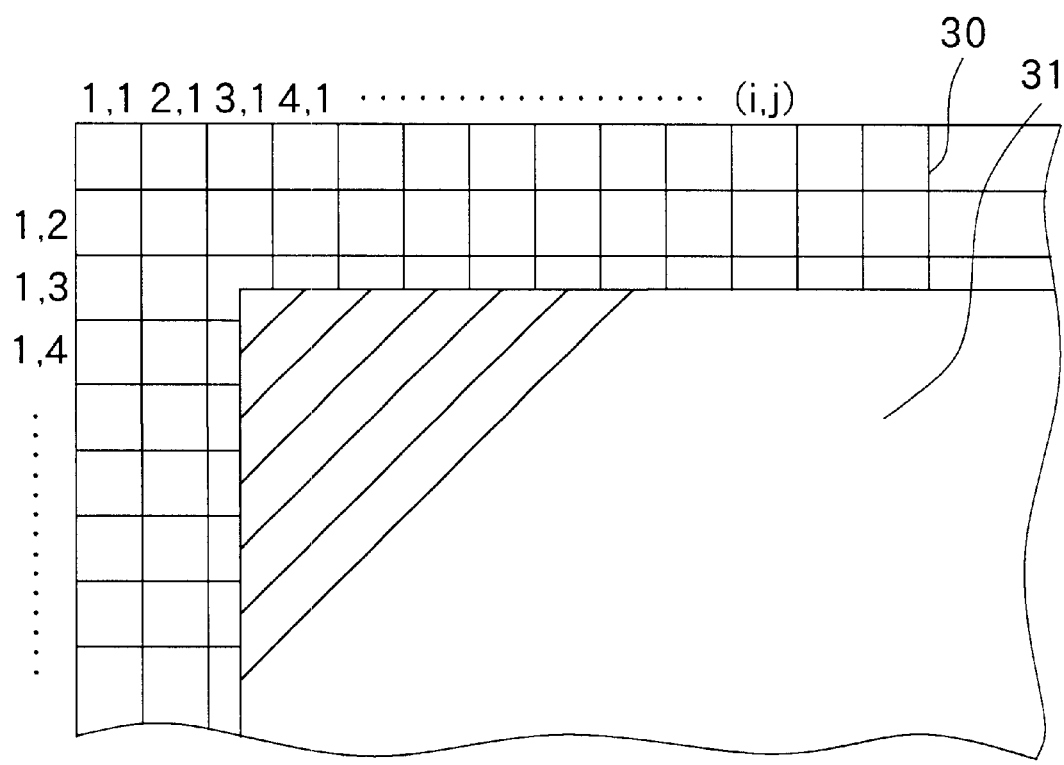
FIG. 6 is a diagram showing a screen region on a frame memory illustrated in FIG. 4.

The formation of the correction data will now be described specifically with reference to FIGS. 6 and 7. In the diagrams, a screen region on the frame memory 14 on the correction data forming apparatus 1 side is shown. In FIG. 6, a region 30 is a screen region on the frame memory 14. The pixel position on the frame memory 14 is expressed by coordinates (i,j) (i,j=1, 2, 3, . . . ). A region 31 is a screen region on the CRT 10a for an image obtained by the image pickup apparatus 13. The region 31 corresponds to a region of an effective screen on which the image is actually displayed on the screen of the CRT 10a. In case of the television image, in general, the size of image information which is supplied is larger than that of the screen on which the image is actually displayed. The difference between the actually displayed image and the original image corresponds to a region called an over-scan region. The image obtained by the image pickup apparatus 13 does not include the information of the over-scan region as a matter of course. The image out of the effective screen cannot be therefore detected. Depending on the state of the actual use of the image display apparatus 10, there may be a case where an image of the over-scan region is displayed on the screen due to an influence of the earth magnetism or the like. Regarding the correction data, it is consequently desirable that the data in the over-scan region be obtained by estimation, by extrapolating information on the effective screen as well as the data in the region of the effective screen of the CRT 10a. The screen region on the frame memory 14 is set larger than the region of the effective screen of the CRT 10a in consideration of the over-scan region.

Figure 7:
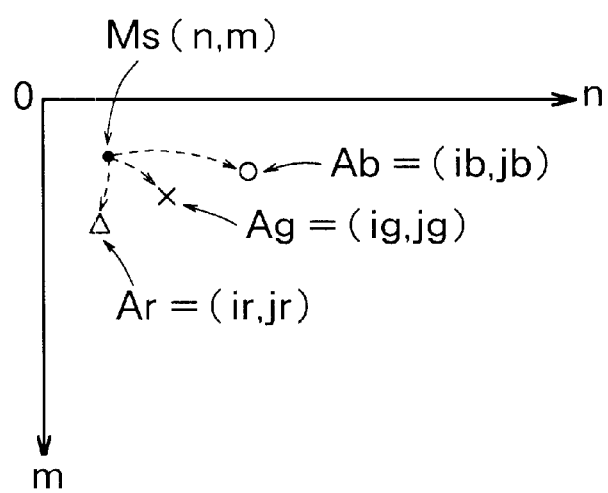

In FIG. 7, coordinates Ms (n, m) (n, m=1, 2, 3, . . .) show an arbitrary pixel position on an image to be displayed having no distortion or the like on the image display apparatus 10. The coordinates Ms are shown as an representative of coordinates $M_R$, $M_G$, and $M_B$ of pixels of the respective colors R, G, and B. When there is no image distortion or the like, the coordinates $M_R$, $M_G$, and $M_B$ are positioned on the same pixel.

As for an image obtained by the image pickup apparatus 13, for example, in case of a raster image of the color R, the pixel on the coordinates $M_R$ (n, m) is displayed in, for example, the position of the point Ar referred to with the mark of "Δ" in FIG. 7 on the frame memory 14 due to image distortion or the like on the image display apparatus 10. The image distortion data calculating unit 15 detects that the point Ar on which the pixel of the color R exists is on the coordinates (ir, jr) on the frame memory 14 and detects address information $M_R$ (n, m)=Ar (ir, jr) by associating the coordinates Ar (ir, jr) with the coordinates $M_R$ (n, m) as the original pixel position. In the embodiment, the movement amount of the pixel is used as correction data as will be described hereinlater. The movement amount, however, can be obtained from the address information $M_R$ (n, m)=Ar (ir, jr).

Similarly, in case of a raster image of the color G, the pixel on the coordinates $M_G$ (n, m) is displayed, for example, in the position of the point Ag referred to with the mark of "x" in FIG. 7 on the frame memory 14 due to image distortion or the like on the image display apparatus 10. The image distortion data calculating unit 15 detects that the point Ag on which the pixel of the color G is positioned is on the coordinates (ig, jg) on the frame memory 14 and detects address information $M_G$ (n, m)=Ag (ig, jg) by associating the coordinates Ag (ig, jg) with the coordinates $M_G$ (n, m) as the original pixel position. In case of a raster image of the color B, the pixel on the coordinates $M_B$ (n, m) is displayed, for example, in the position of the point Ab referred to with the mark of "o" in FIG. 7 on the frame memory 14 due to image distortion or the like on the image display apparatus 10. The image distortion data calculating unit 15 detects that the point Ab on which the pixel of the color B exists is on the coordinates (ib, jb) on the frame memory 14 and detects address information $M_B$ (n, m)=Ag (ib, jb) by associating the coordinates Ab(ib, jb) with the coordinates $M_B$ (n, m) as the original pixel position.

The image distortion data calculating unit 15 detects address information of each pixel position with respect to the whole raster image of each color deviated by, for example, image distortion or the like on the image display apparatus 10, calculates the correction data of each color from the address information of each color, and stores the calculated correction data of each color into the correction data memory 16.

The image data correcting operation for correcting a defective display state such as image distortion, which is to be performed in the image display apparatus 10, will now be described. The correcting operation is performed for each of the colors R, G, and B. The calculating method is substantially the same with respect to the three colors though only the correcting data used for calculation is different. The correcting operation for the color R will be described hereinbelow as a representative and the description on the colors G and B is omitted here in otherwise described.

Figure 8A:
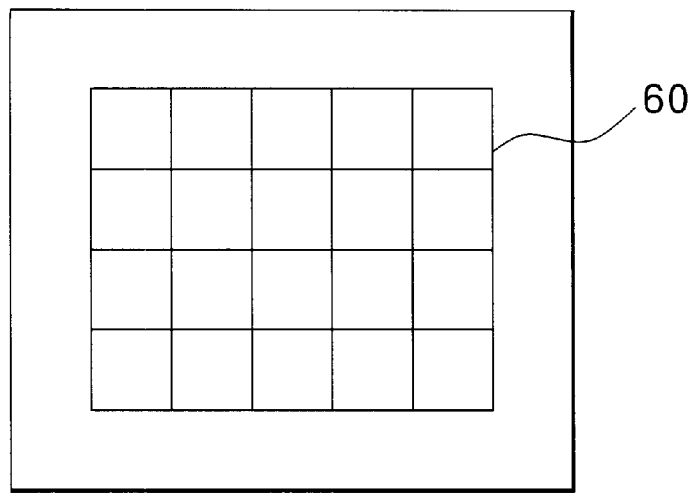
FIG. 8A is a diagram showing an image on a frame memory at the front stage when a correcting operation is not performed.
Figure 8B:
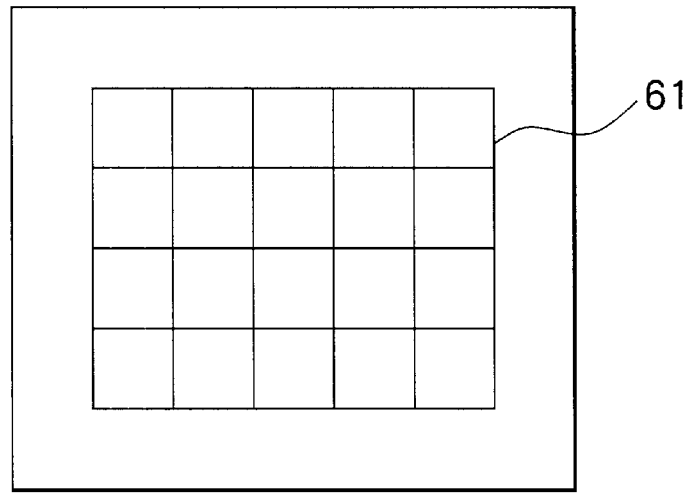
FIG. 8B is a diagram showing an image on a frame memory at the post stage when the correcting operation is not performed.
Figure 8C:
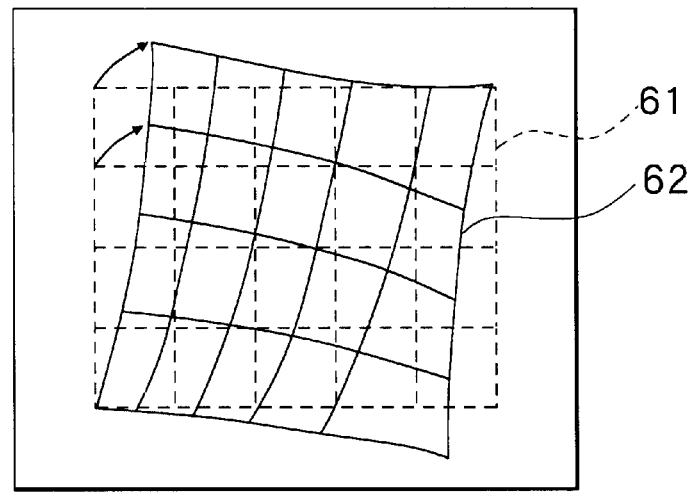
FIG. 8C is a diagram showing an image on the CRT when the correcting operation is not performed.
Figure 9A:
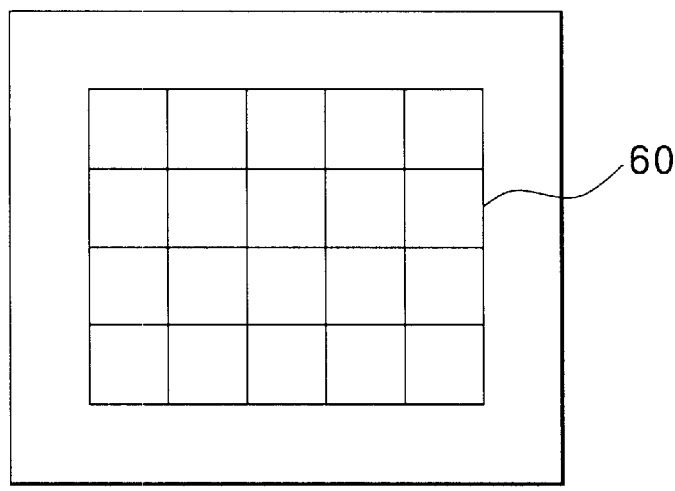
FIG. 9A is a diagram showing an image on the frame memory at the front stage when the correcting operation is performed.
Figure 9B:
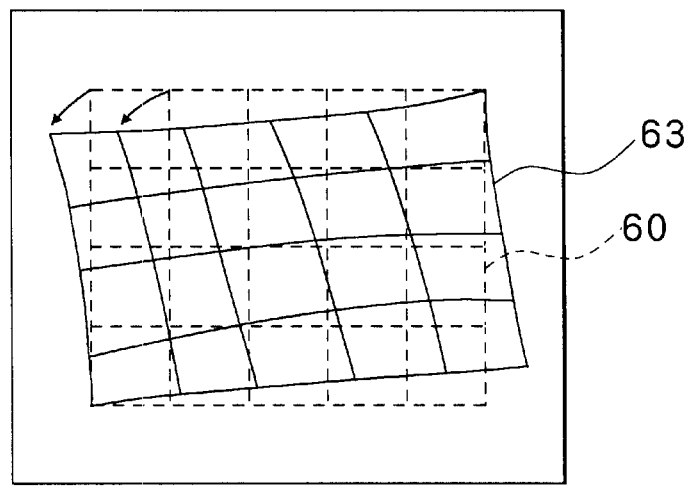
FIG. 9B is a diagram showing an image on the frame memory at the post stage when the correcting operation is performed.
Figure 9C:
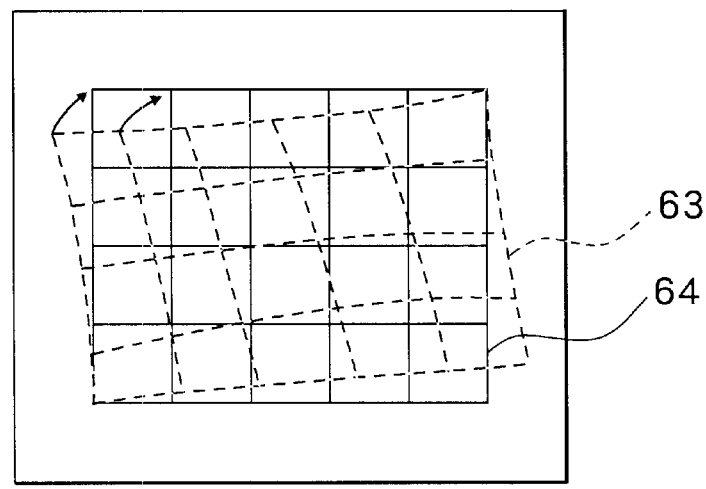
FIG. 9C is a diagram showing an image on the CRT when the correcting operation is performed.

FIGS. 8A to 8C and FIGS. 9A to 9C show the states where an input image is deformed in the image display apparatus 10. In this case, a grid image is inputted as an example of an input image. FIGS. 8A and 9A illustrate images on the frame memory 45. FIGS. 8B and 9B show images on the frame memory 47. FIGS. 8C and 9C show images actually displayed on the screen of the CRT 10a.

Referring to FIGS. 8A to 8C, a state of deformation in an input image when the correcting operation using the correction data is not performed in the image display apparatus 10 will be described, When the correcting operation is not performed, an image 60 (FIG. 8A) on the frame memory 45 and an image 61 (FIG. 8B) on the frame memory 47 have the same shape as that of the input image. After that, the image is distorted due to the characteristics of the CRT 10a and, for example, a deformed image 62 shown in FIG. 8C is displayed on the screen of the CRT 10a. The image shown by broken lines in FIG. 8C is the image 61 on the frame memory 47 which corresponds to an image to be displayed. The phenomenon that the same deformation occurs in the images of the colors R, G, and B in the process of displaying the image on the CRT 10a is the image distortion. The state where the images of the respective colors are deformed differently denotes misconvergence. To correct the distortion in the image as shown in FIG. 8C, performing deformation in the direction opposite to the characteristics of the CRT 10a at the stage before the image signal is supplied to the CRT 10a is sufficient.

FIGS. 9A, 9B, and 9C show a change in the input image when the correcting operation is performed in the image display apparatus 10. In the case of performing the correcting operation as well, the image 60 (FIG. 9A) on the frame memory 45 has the same shape as that of the input image. The image stored in the frame memory 45 is supplied to the DSP circuit 46. In the DSP circuit 46, a correcting operation for deforming the input image in the reverse direction to the deformation of an image caused by the CRT 10a (deformation due to the characteristics of the CRT 10a, refer to FIG. 8C) is executed on the basis of the correction data. And the corrected image 63 (FIG. 9B) is stored into the frame memory 47. The image shown by broken lines in FIG. 9B is the image 60 on the frame memory 45 and corresponds to an image which has not been subjected to the correcting operation. The signal of the image 63 on the frame memory 47 deformed in the reverse direction to the characteristics of the CRT 10a is supplied to the CRT 10a via the D/A converter 48 and is further distorted due to the characteristics of the CRT 10a, thereby obtaining a shape similar to the input image and displaying an ideal image 64 (FIG. 9C) on the screen as a result. The image shown by broken lines in FIG. 9C corresponds to the image 63 on the frame memory 47.

Figure 10:
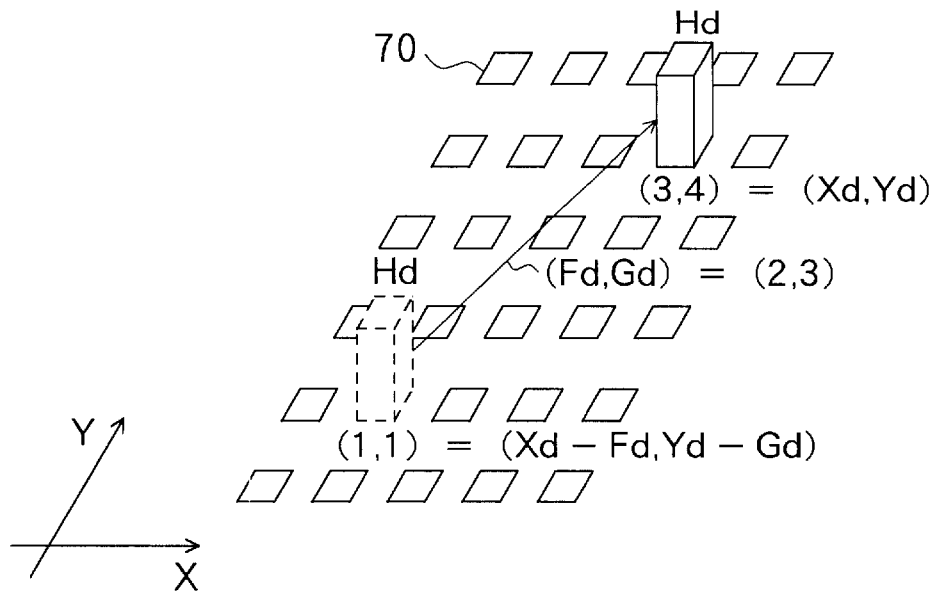
FIG. 10 is a diagram for explaining a first method of the correcting process in the image display apparatus.

The correction data necessary for the correcting process and the correcting process executed by the DSP circuit 46 will be described more specifically. FIG. 10 is a diagram for explaining a first method of the correcting process executed by the DSP circuit 46. In the diagram, pixels 70 are arranged in a grid shape in integer positions on the XY coordinates. The diagram illustrates an example of the movement of only one pixel in the process of the operation and shows that the value of an R signal (hereinafter, referred to as "R value") Hd as the value of a pixel on the coordinates (1, 1) before the correcting operation by the DSP circuit 46 is moved to the coordinates (3, 4) after the operation. The part shown by broken lines in the diagram indicates the R value (pixel value) before the correcting operation. Denote the movement amount of the R value by a vector (Fd, Gd). In this example, the vector (Fd, Gd) is as follows: (Fd, Gd)=(2, 3). Alternatively, this can be explained as follows: if the coordinates of the pixel after the operation is (Xd, Yd), the pixel is a copy of the R value Hd in the coordinates (Xd–Fd, Yd–Gd). When the copying operation is performed on all of the pixels after the correcting operation, an image of one frame to be stored into the frame memory 47 is completed. Therefore, the movement amount (Fd, Gd) corresponding to each pixel after the operation is sufficient for the correction data to be stored in the correction data memory 42.

In case of limiting the value of the movement amount (Fd, Gd) as correction data used for the correcting operation to an integer value, performing the simple operation of moving the pixel value as described above is sufficient for a correcting operation. An image corrected by executing the operation under the condition that the value of the movement amount is limited to an integer value, however, has several inconveniences: one is what is called a "jaggy" line that should be a straight line image; another is the uneven thickness of a character image that causes the image to look unnatural. A method to cope with the problems is to extend the value of the movement amount (Fd, Gd) to a real number, to estimate the R value in an imaginary pixel, and to use the estimated value.

Figure 11:
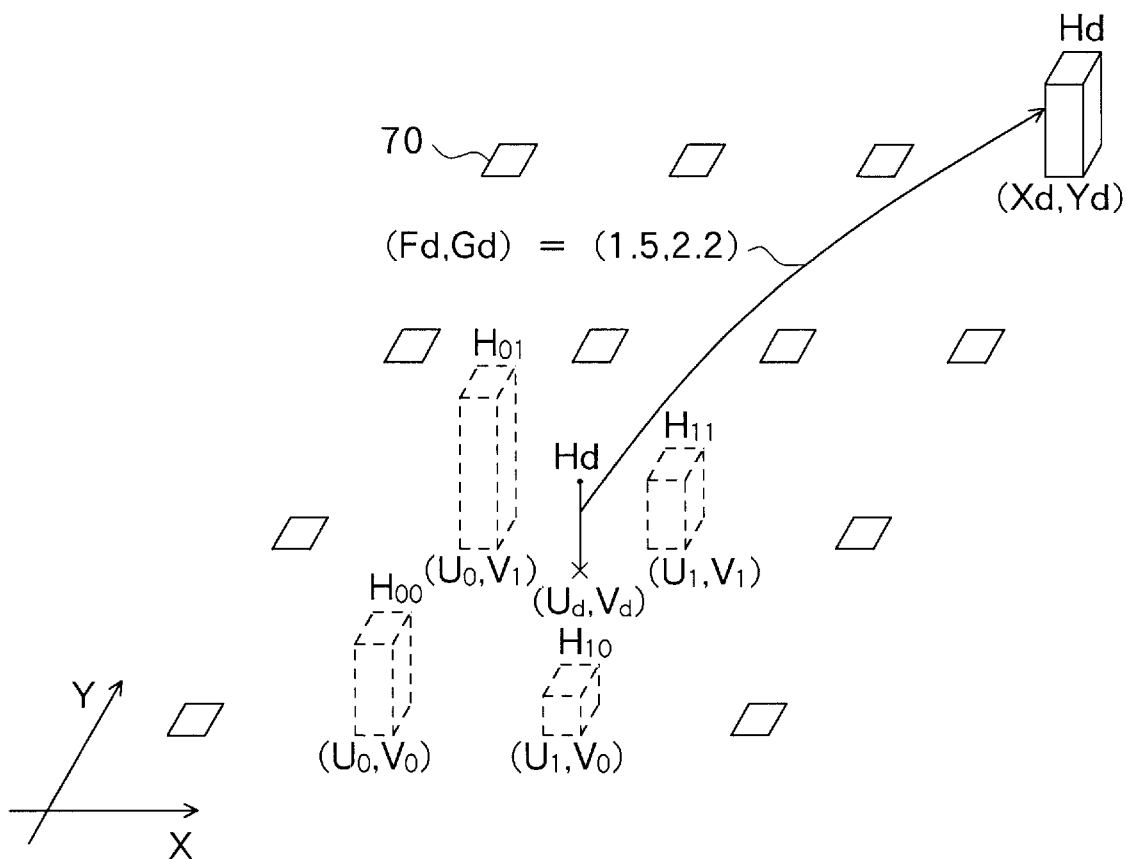
FIG. 11 is a diagram for explaining a second method of the correcting process in the image display apparatus.

Referring to FIG. 11, a second method of the correcting operation will be described. This method of the correcting operation is adopted when the movement amount (Fd, Gd) is a real number. FIG. 11 shows how to obtain the R value Hd of the pixel after the operation when the correction data in the coordinates (Xd, Yd), that is, the movement amount (Fd, Gd) is given in a real number. Coordinates (Ud, Vd) of a pixel to be referred to before the operation are given by the following expression (1).

$$(Ud, Vd) = (Xd - Fd, Yd - Gd) \quad (1)$$

When it is assumed that (Fd, Gd)=(1.5, 2.2), no pixel exists in the coordinates (Ud, Vd) since the pixels exist only in the coordinates of integers. In the embodiment, therefore, an operation of estimating the R value of the pixel in the coordinates (Ud, Vd) from four pixels near the coordinates (Ud, Vd) by linear interpolation is performed. In FIG. 11, the parts shown by broken lines illustrate the four pixels. Denote integers obtained by rounding off decimal fraction parts of the coordinate values Ud and Vd by U0 and V0, respectively. Then the coordinates of the four pixels near the coordinates (Ud, Vd) are: (U0, V0), (U1, V0), (U0, V1) and (U1, V1) where U1=U0+1 and V1=V0+1. Let the R values of the pixels in the coordinates U0, V0), (U1, V0), (U0, V1), and (U1, V1) be H00, H10, H01, and H11, respectively. The R value Hd of the pixel in the coordinates (Ud, Vd) to be obtained is given by the following expression (2).

$$Hd = (U1-Ud) \times (V1-Vd) \times H00 + (Ud-U0) \times (V1-Vd) \times H10 + (U1-Ud) \times (Vd-V0) \times H01 + (Ud-U0) \times (Vd-V0) \times H11 \quad (2)$$

The above-mentioned correcting method will be examined in detail. The pixel values (H00, H10, H01, H11) used to estimate the R values are selected and determined by the integer parts in respective values of the movement amount (Fd, Gd) as correction data and the coefficient multiplied by each pixel value in the expression (2) (for example, the coefficient of H00 is (U1–Ud)×(V1–Vd)) is determined by the decimal fraction part of the movement amount.

Although the R value of the pixel in the coordinates (Ud, Vd) is estimated by the method of the linear interpolation using the pixel values in the near four points in the example, the estimating method is not limited to the above method but other calculating methods can be also used. In the above-described example, the correction data is interpreted as a relative difference in coordinates used to refer to the pixel value which has not been subjected to the operation. In this case, the pixel value Hd in imaginary coordinates (Ud, Vd) is estimated, and then the pixel value is moved to the corrected coordinates (Xd, Yd). On the contrary, it is also possible to interpret the correction data as a movement amount of the pixel value Hd which has not been subjected to the operation. In this case, the pixel value is moved by the movement amount (Fd, Gd), and then the pixel value Hd which has been subjected to the operation is allocated to the four points near the coordinates after the movement. According to the latter method, the program to execute the operation becomes slightly complicated. However, this method can be obviously used.

The movement amount (Fd, Gd) as correction data is defined with respect to the three colors RGB of each pixel. If the correction data is set for all of the pixels, the total data amount therefore becomes too large to be ignored, and a memory of a large capacity to store the correction data becomes necessary. This causes the cost increase of the apparatus. Considerable working time is also required to measure the image distortion amount of the CRT 10a and the misconvergence amount with respect to all of the pixels on the correction data forming apparatus 1 side, calculate the correction data, and supply the correction data to the image display apparatus 10 side. There is another method that utilizes the fact that the image distortion amount of the CRT 10a and the misconvergence amount do not fluctuate so much among pixels positioning close to each other. According to this method, the entire screen region is divided into some regions, and the correction data is supplied to only representative pixels in each of the divided regions. The correction data supplied to the other pixels is obtained by estimating from the correction data of the representative pixels can be considered. This method contributes to the reduction of the total amount of the correction data and the working time.

A third method of the correcting process, in which the correcting process is executed by giving the correcting data only to the representative pixels, will now be described. Since the pixel movement in a divided region is determined by the movement amounts of the representative pixels, the positions of the representative pixels will be called control points hereinbelow.

Figure 12:
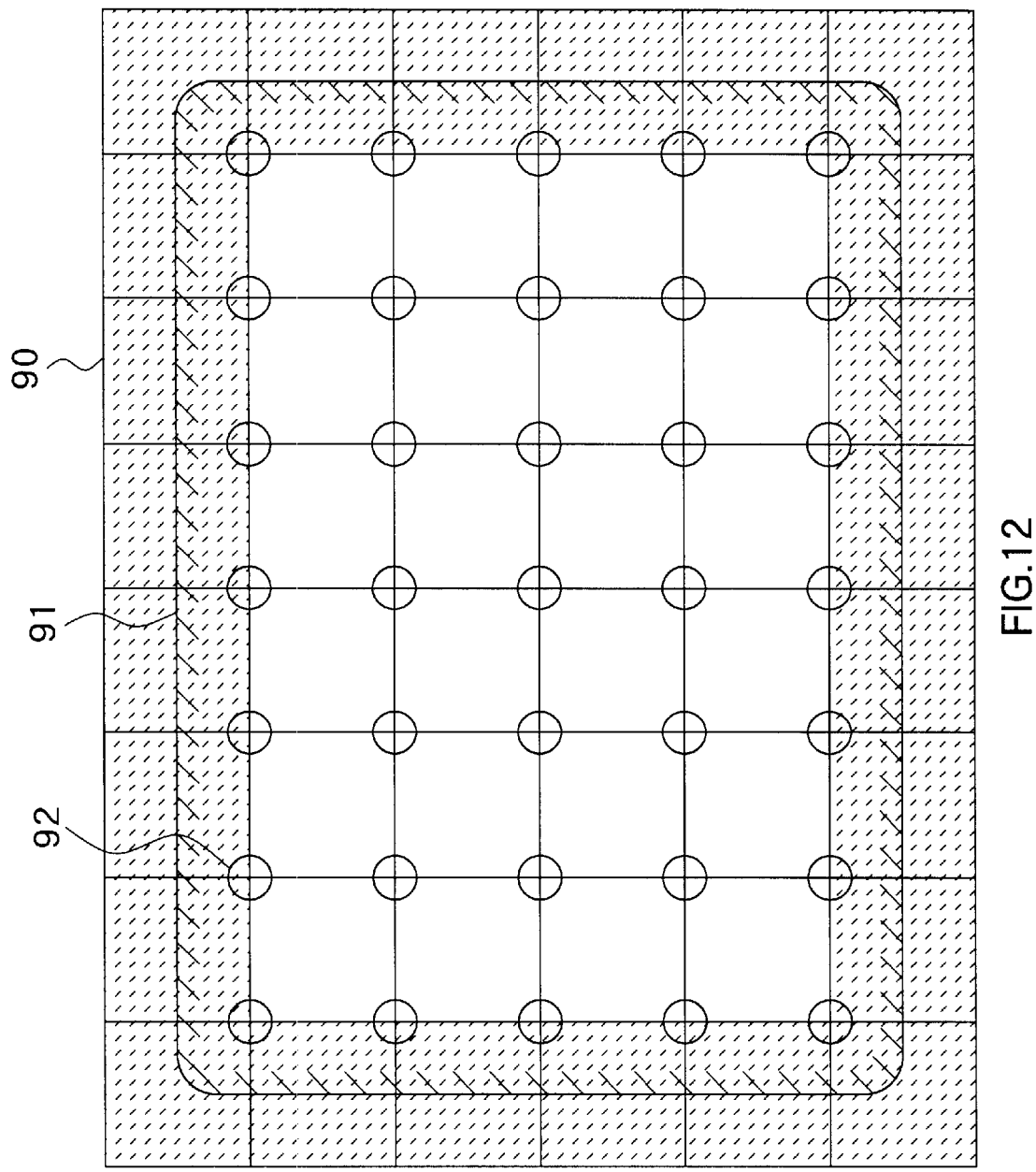
FIG. 12 is a diagram for explaining a third method in the correcting process in the image display apparatus.

FIG. 12 shows a case where the entire screen region on the frame memory 47 is divided into a plurality of rectangular regions and control points are set in a cross grating. As mentioned above, in case of a television image or the like, the size of image information which is supplied is larger than the screen size actually displayed on the screen of the CRT 10a and the region called an over-scan region exists. As illustrated, the image region 90 of the frame memory 47 is usually set larger than the effective screen region 91 of the CRT 10a in consideration of the over-scan region. On the frame memory 47, a number of control points 92 are set so that each of the control points 92 also serves as the control points of the neighboring divided regions. In the example of the diagram, therefore, the total number of the control points 92 is equal to only 35 (=7×5).

When the image region on the frame memory 47 has 640 pixels in the lateral direction×480 pixels in the vertical direction, the total number of pixels is 307,200 (=640×480). From this, it follows that the total number of the correction data is considerably reduced when the correction data is given to the representative control points 92 as compared with the case where the correction data is given to all of the pixels. For example, when it is assumed that correction data of 8 bits is given to the three colors of RGB in all of the pixels both in the X and in the Y directions, the least capacity required for the correction data memory 42 is given by Equation (3). According to the method of setting the control points as illustrated in the diagram, however, the sufficient capacity is given by Equation (4). Not only the capacity but also the working time required to correct the image are considerably reduced.

$$(8\times2\times3)\times(640\times480)/8=1{,}843{,}200 \text{ (bytes)} \quad (3)$$

$$(8\times2\times3)\times(7\times5)/8=210 \text{ (bytes)} \quad (4)$$

It is not always necessary to set the control points in the grid as shown in the diagram. The control points may be set in arbitrary positions outside the grid.

Figure 13:
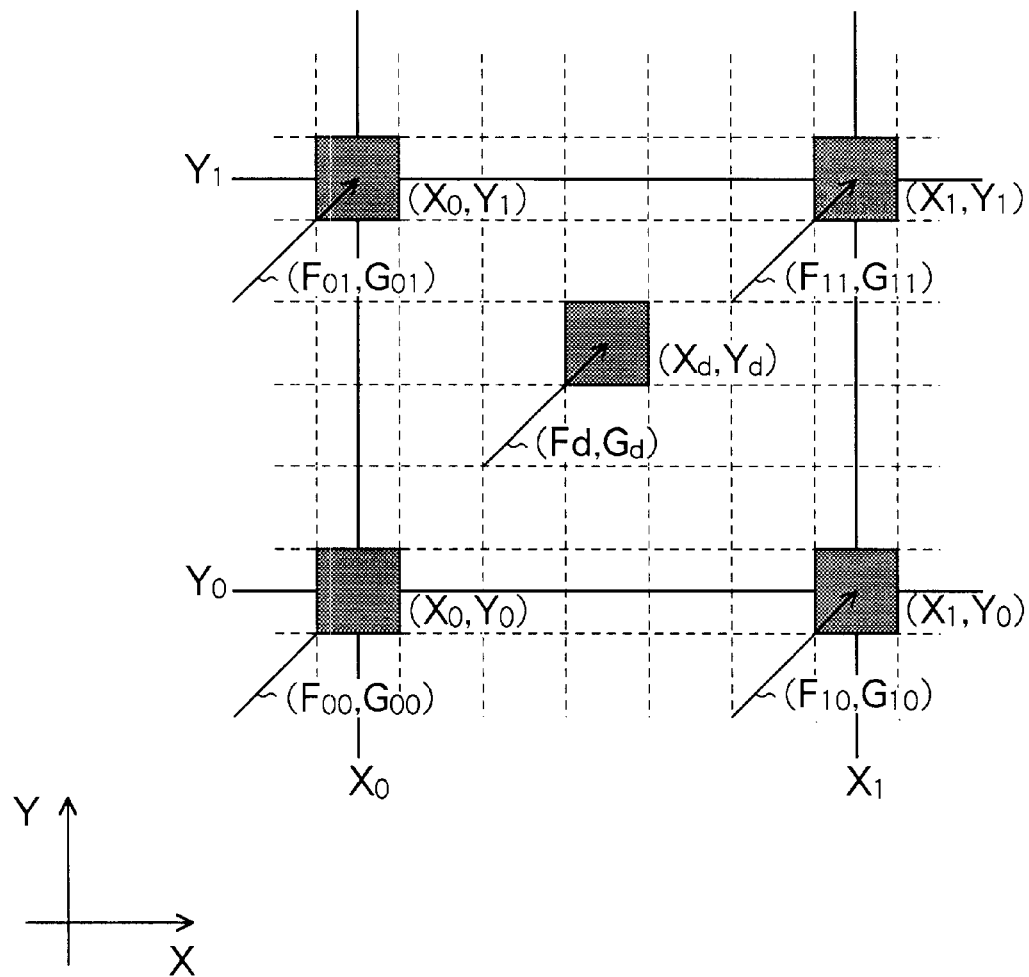
FIG. 13 is a diagram for explaining a method of obtaining a movement amount of a pixel in a divided region by interpolation.
Figure 14:
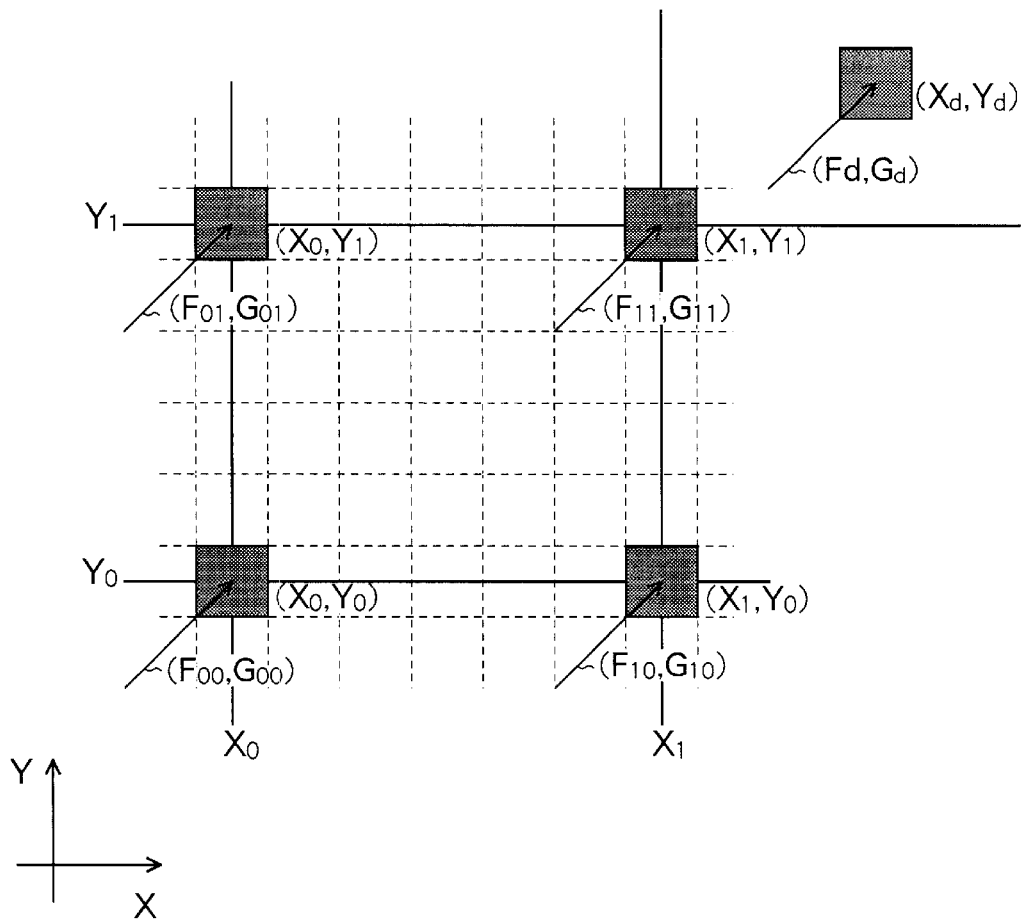
FIG. 14 is a diagram for explaining a method of obtaining a movement amount of a pixel in a divided region by extrapolation.

Referring to FIGS. 13 and 14, a method of obtaining the movement amount of an arbitrary pixel in each divided region when the control points are set in the grid as shown in FIG. 12 will be described. FIG. 13 is used to explain a method of obtaining the movement amount by interpolation. FIG. 14 is used to explain a method of obtaining the movement amount by extrapolation. The interpolation refers to a method of interpolating the movement amount of an arbitrary pixel positioning inside the region formed by linking a plurality of control points. The extrapolation refers to a method of interpolating the movement amount of an arbitrary pixel positioning outside the region formed by linking a plurality of control points. Although the movement amount can be obtained by the extrapolation with respect to all of the pixels, it is desirable that the extrapolation be used only with respect to pixels in the peripheral region of the screen (region idicated by shading with diagonal broken lines shown in FIG. 12). As mentioned above, generally, the extrapolation is used in the divided regions around the screen including the outer frame of the entire image region and the interpolation is used in the other region. Both in the interpolation and in the extrapolation, substantially the same calculating method can be used. In the diagrams, denote the coordinates of the four control points by (X0, Y0), (X1, Y0), (X0, Y1), and (X1, Y1). Further, let the movement amounts corresponding to the correction data for the four control points be (F00, G00), (F10, G10), (F01, G01), and (F11, G11), respectively. Then the movement amount (Fd, Gd) of the pixel in arbitrary coordinates (Xd, Yd) can be given by the following equations (5) and (6). Those arithmetic expressions can be commonly used for the interpolation and extrapolation.

$$Fd=\{(X1-Xd)\times(Y1-Yd)\times F00+(Xd-X0)\times(Y1-Yd)\times F10+(X1-Xd)\times(Yd-Y0)\times F01+(Xd-X0)\times(Yd-Y0)\times F11\}/\{(X1-X0)\times(Y1-Y0)\} \quad (5)$$

$$Gd=\{(X1-Xd)\times(Y1-Yd)\times G00+(Xd-X0)\times(Y1-Yd)\times G10+(X1-Xd)\times(Yd-Y0)\times G01+(Xd-X0)\times(Yd-Y0)\times G11\}/\{(X1-X0)\times(Y1-Y0)\} \quad (6)$$

The calculation shown by the expressions (5) and (6) is executed according to the method of estimation by linear interpolation. The estimation method is not, however, limited to the linear interpolation but other operation methods can be also used.

Figure 15:
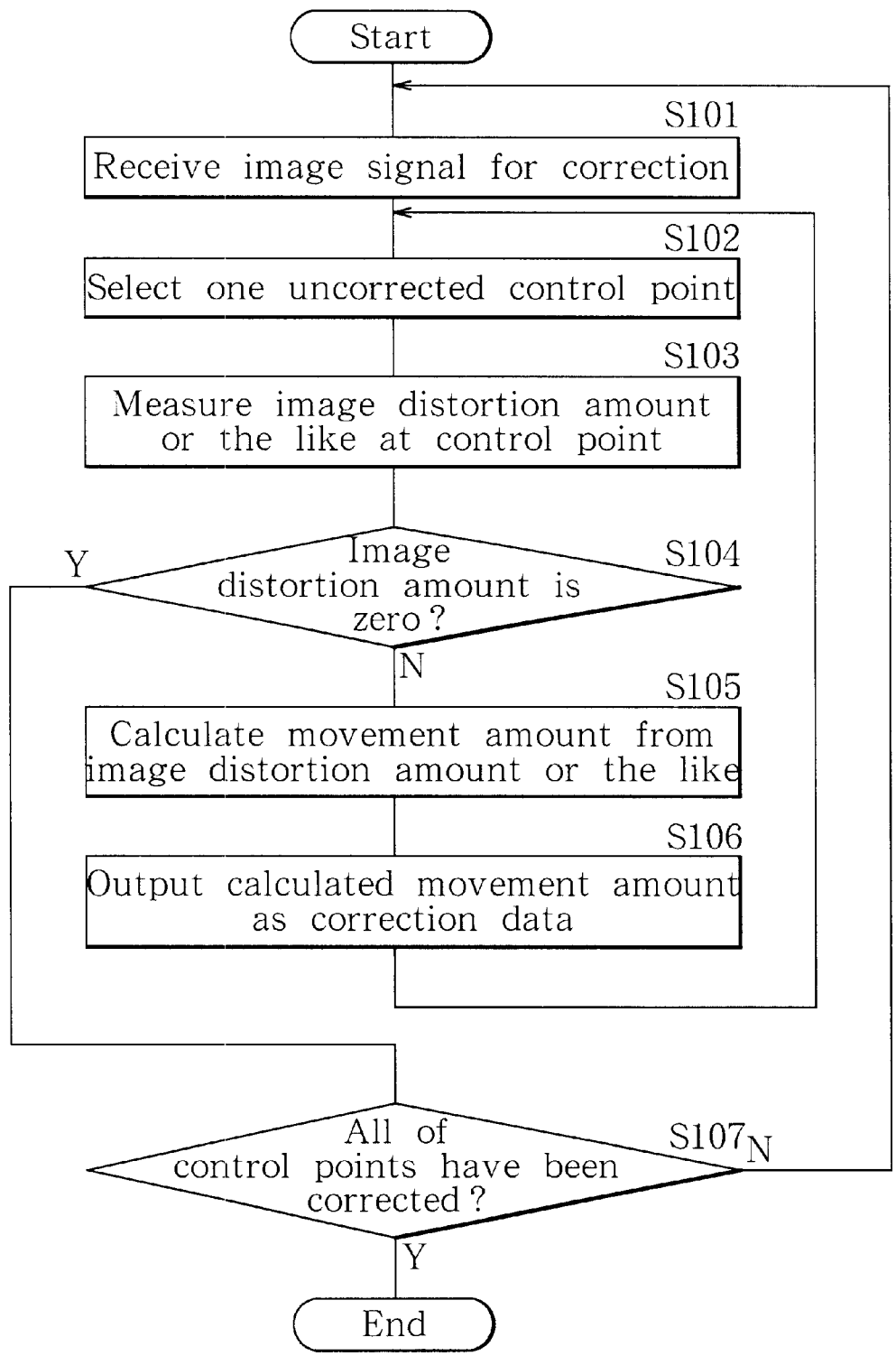
FIG. 15 is a flowchart showing the third method of the correcting process in the image display apparatus.

Referring to the flowchart of FIG. 15, the operation, mainly the operation on the correction data forming apparatus 1 side, for determining all of the correction data corresponding to the control points will now be described.

An image signal for correction is supplied from the raster generating unit 12 to the image display apparatus 10 (step S101). The image signal for correction is, as shown in FIG. 12, for example, a signal of a grid image when displayed on the screen of the CRT 10a. In this case, the control points are positioned at the intersecting points of the grid. The image pickup apparatus 13 obtains an image for correction displayed on the screen on the CRT 10a and the obtained image data is stored into the frame memory 14 on the frame unit basis. The image data stored in the frame memory 14 is supplied to the image distortion data calculating unit 15. The image distortion data calculating unit 15 selects one uncorrected control point (step S102) and measures the image distortion amount or the misconvergence amount at the selected control point (step S103). The image distortion data calculating unit 15 determines whether the measured image distortion amount or the like is zero or not (step S104).

When the image distortion amount or the like is not zero (when the image distortion or misconvergence exists) (N in step S104), the image distortion data calculating unit 15 calculates a movement amount required to correct the image distortion or the like (step S105) and outputs the calculated movement amount as correction data (step S106). The correction data outputted from the image distortion data calculating unit 15 is stored in the correction data memory 16 and transmitted to the image display apparatus 10 side. On the image display apparatus 10 side, the transmitted correction data is stored into the correction data memory 42 via the external communication and writing unit 41. Further, on the image display apparatus 10 side, the correcting operation is performed by the DSP circuit 46 on the control point subject to the correction by using the correction data stored in the correction data memory 42. The image distortion data calculating unit 15 repeats the process of step S103 and subsequent processes for measuring again the image distortion amount or the misconvergence amount at the control point on which the correcting operation is performed. By repeating such processes until the image distortion amount or the like becomes small enough to be ignored, the correcting operation to the selected one control point is finished.

When the image distortion amount or the like of the selected one control point becomes zero (wherein neither image distortion nor misconvergence exists) (Y in step S104), the image distortion data calculating unit 15 determines whether the correcting operation with respect to all of the control points has been finished or not (step S107). When there is a control point which has not been subjected to the correcting operation yet (N in step S107), one of the uncorrected control points is selected and the process in step S102 and subsequent processes are repeated. When the correcting operation to all of the control points is finished (Y in step S107), the process is finished.

As described above, according to the embodiment, the correction data for correcting the display state of the image on the basis of the image displayed on the screen is formed by the correcting data forming apparatus 1. The operation of correcting the image data is performed so that the image is properly displayed on the image display apparatus 10 side on the basis of the correction data, and the corrected image data is outputted to the CRT 10a. As a result, the image distortion and the misconvergence can be reduced more as compared with the related art of adjusting the image by using the deflecting yoke or the like. For example, in the related art, in order to eliminate the image distortion or the like by the deflecting yoke, it is necessary to distort the deflecting magnetic field. This causes a problem that the magnetic fields become nonuniform and the magnetic field deteriorates the focus (spot size) of the electron beam. According to the embodiment, it is unnecessary to eliminate the image distortion or the like by the magnetic field of the deflecting yoke. The deflecting magnetic fields can therefore remain uniform, and thus the focus characteristics can be improved. Once all of the correction data is formed and stored on the image display apparatus 1 side, the image distortion or the like can be automatically corrected after that.

According to the embodiment, since the image distortion or the like can be automatically adjusted, the manufacturing cost and manufacturing time of the image display apparatus 10 can be reduced as compared with the adjustment in the method of the related art. Further, in the related art, the deflecting yoke is used to correct and adjust the image distortion or the like and thus the period for developing and designing the deflecting yoke is needed. In contrast, according to the embodiment, it is unnecessary to adjust the image distortion or the like by using the deflecting yoke. This contributes to the reduction of the period for developing the deflecting yoke as well as the cost reduction. Further, in the adjusting method of the related art, since the correction amount of the image distortion or the like is not so large, it is necessary to suppress variations in the assembly of the CRT and the deflecting yoke in order to suppress the image distortion or the like caused by the manufacturing variations of the CRT and the deflecting yoke to a certain extent. In the embodiment, the correction amount of the image distortion or the like is large and thus the less accuracy in the assembly of the CRT and the deflecting yoke is required. Accordingly, the reduction of the manufacturing cost can be also expected. When the influence by the external magnetic field such as the earth magnetism is known in advance, the information can be used as correction data, so that the image display apparatus having more excellent characteristics can be constructed.

As described above, according to the embodiment, a defective display state such as the image distortion or the like is corrected at low cost and a high quality image can be displayed. The image distortion on a CRT whose angle is becoming wider in recent years or a flat CRT can be also optimally corrected.

Second Embodiment

A second embodiment of the invention will be described. In the following description, the same components as those in the form of the first execution are designated by the same reference numerals and their description is omitted where appropriate.

Figure 16:
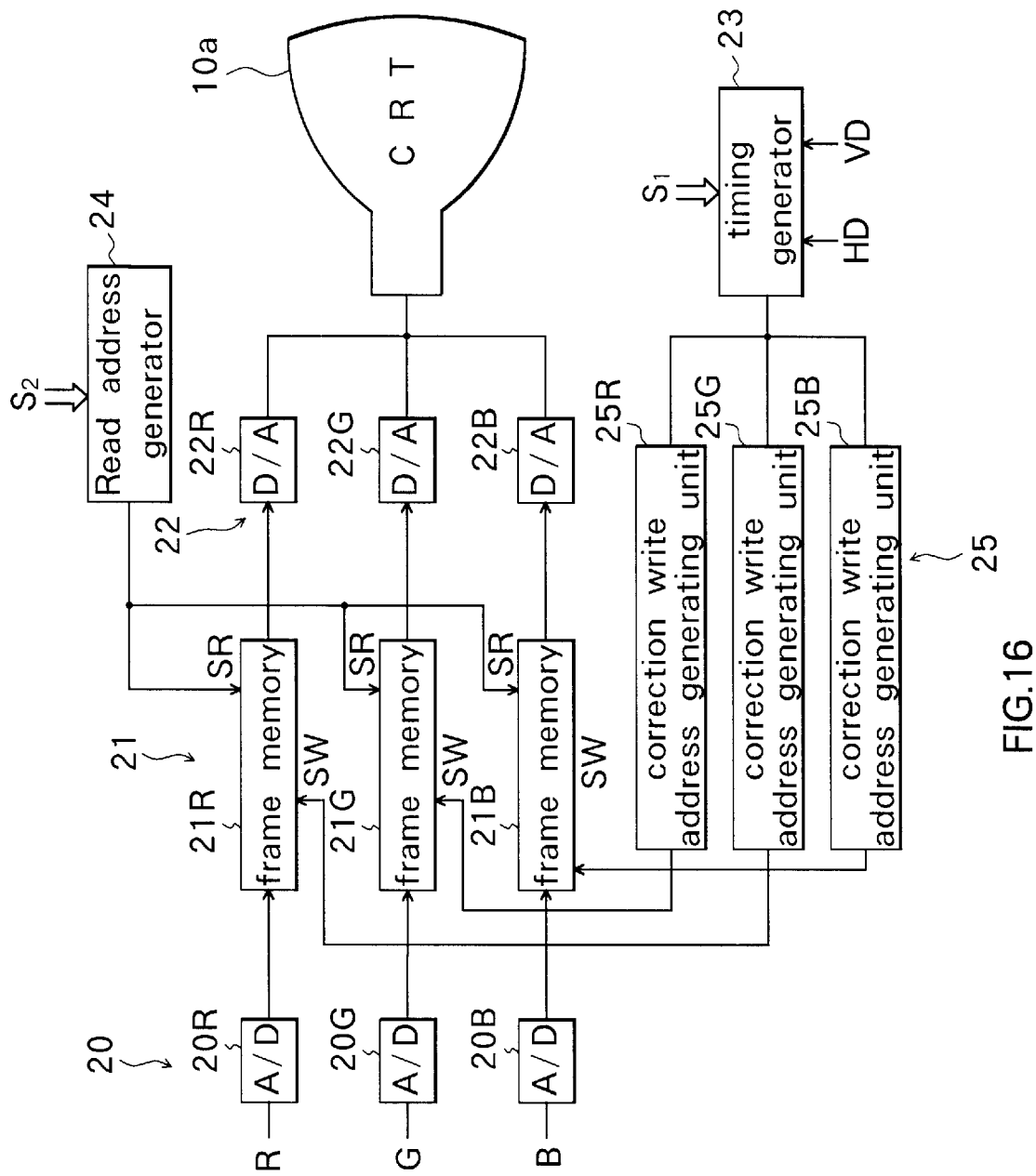
FIG. 16 is a block diagram specifically showing an image display apparatus according to another form of execution of the invention.

FIG. 16 is a block diagram showing a schematic construction of an image display apparatus according to the form of the second execution of the invention. The image display apparatus shown in the diagram comprises: an A/D converter 20 (20R, 20G, 20B) for converting inputted analog component video signals of colors R, G, and B into digital signals color by color and outputting the digital signals; a frame memory 21 (21R, 21G, 21B) for storing the digital signal of each color outputted from the A/D converter 20 on a frame unit basis; a correction write address generating unit 25 (25R, 25G, 25B) for controlling an address position on the frame memory 21 when the image data outputted from the A/D converter 20 is stored into the frame memory 21; a timing generator 23 for controlling the timing at which data is written by the correction write address generating unit 25; a read address generator 24 for generating an address signal SR for reading the data stored in the frame memory 21; and a D/A converter 22 (22R, 22G, 22B) for converting the digital signal for each color read from the frame memory 21 to an analog signal and outputting the analog signal to the CRT 10a. In case of a digital television receiver or the like, the component video signal is supplied in the form of a digital signal, so that the A/D converter 20 can be omitted from the construction.

The frame memory 21 is a dual type memory to/from which data can be written/read. The frame memory 21 corresponds to the frame memories 45 and 47 shown in FIG. 5. The correction write address generating unit 25 corresponds to the DSP circuit 46 shown in FIG. 5.

The correction write address generating unit 25 generates a write address signal SW to the frame memory 21 on the basis of the correction data outputted from the correction data forming apparatus 1 (FIG. 4) side. In the frame memory 21, consequently, the image data outputted from the A/D converter 20 is stored in the address position instructed by the write address signal SW and is rearranged. The inputted image data is stored in a predetermined address position instructed by the write address signal SW in the frame memory 21. Thereby the corrected image data is stored into the frame memory 21.

The timing generator 23 and the read address generator 24 are controlled by clock control signals $S_1$ and $S_2$ from a system controller (not shown) which controls the timings of sync signals. The image data rewritten in the frame memory 21 based on the write address signal SW is read in response to an address signal SR from the read address generator 24 and outputted to the D/A converter 22.

By storing the correction data formed by the correction data forming apparatus 1 into the correction write address generating unit 25, the image distortion or the like can be automatically corrected thereafter.

The other construction, operation, and effects in the form of the second execution are similar to those in the form of the first execution.

The invention is not limited to the foregoing forms of execution but can be variously modified. For example, although the system in which the correction data is automatically written in the image display apparatus 1 side by using the image pickup apparatus 13 has been described in-each of the foregoing forms of execution, the screen of the image display apparatus 10 for forming the correction data may be measured visually. In this case, for instance, an adjustment knob is provided in the image display apparatus 10. By adjusting the adjustment knob, the information measured visually can be directly set as correction data on the image display apparatus 10 side. In this case, the external communication and writing unit 41 (FIG. 5) and the like can be omitted from the construction.

Although the example of using the analog composite signal in the NTSC system is used as the input signal $D_{IN}$ has been described in the form of the first execution, the input signal $D_{IN}$ is not limited to the analog composite signal. For example, an RGB analog signal may be used as the input signal $D_{IN}$. In this case, an RGB signal can be obtained without the composite/RGB converter 43 (FIG. 5). A digital signal as a signal used in a digital television or the like may be inputted as the input signal $D_{IN}$. In this case, a digital signal can be directly obtained without the A/D converter 44 (FIG. 5). In the case where any of the input signals is used, the frame memory 45 and subsequent components can have an almost similar circuit construction in the example of the circuit shown in FIG. 5.

In the circuit shown in FIG. 5, the frame memory 47 may be omitted from the construction and the image data outputted from the DSP circuit 46 may be supplied directly via the D/A converter 48 to the CRT 10a.

As described above, according to the image display correcting apparatus and the image display correcting method of the invention, the correcting operation is performed on inputted image data on the basis of the correction data for correcting a display state of an image, obtained based on an image displayed on the screen so that an image is properly displayed, and the corrected image data is outputted as image data for display. Thus, a defective display state such as image distortion is corrected at low cost and a high quality image can be displayed.

According to another image display correcting apparatus of the invention, a plurality of pixels in uncorrected image data are selected on the basis of an integer part of a movement amount in order to calculate one pixel value in corrected image data. Meanwhile a calculation value to calculate one pixel value for the selected plurality of pixels is determined on the basis of the decimal fraction part of the movement amount. Thus, the occurrence of jaggy lines or the like in a corrected image is prevented and an image having a higher quality can be displayed.

According to still another image display correcting apparatus of the invention, a pixel value of each of a plurality of representative pixels in a corrected image data is calculated by using a value of a pixel in a position deviated only by the movement amount from the representative pixel in uncorrected image data, while a pixel value of each of the other pixels than the representative pixels in the corrected image data is calculated by using a value of a pixel in a position deviated only by the movement amount from a proper display position obtained by estimation from the movement amount of the representative pixel in the uncorrected image data. Consequently, the correction data is given only to the representative pixels and the correction data in the other pixels can be estimated from the correction data of the representative pixels. Thus, the total amount of the correction data can be reduced and the working time necessary for the correction can be shortened.

According to the image display apparatus and the image display method of the invention, the correcting operation is performed on inputted image data on the basis of correction data for correcting a display state of an image, obtained based on an image displayed on a screen so that an image can be properly displayed, and the corrected image data is outputted as image data for display. An image is displayed on the basis of the outputted image data for display. Consequently, a defective display state such as image distortion is corrected at low cost and a high quality image can be displayed.

According to the image display correcting system of the invention, the correction data forming apparatus obtains an image displayed on the screen of the image display apparatus and forms correction data for correcting a display state of an image on the basis of the obtained image. The image display apparatus performs the correcting operation on the inputted image data on the basis of the correction data formed by the correction data forming apparatus so that an image is properly displayed, outputs the corrected image data as image data for display, and displays an image on the basis of the image data for display. Consequently, the correction data can be automatically produced, and the image can be automatically corrected on the basis of the correction data. Therefore, a defective display state such as image distortion is corrected at low cost, and the high quality image can be displayed is produced.

Obviously many modifications and variations of the present invention are possible in the light of the above teachings. It is therefore to be understood that within the scope of the appended claims the invention may be practiced otherwise than as specifically described.

What is claimed is:

1. An image display correcting apparatus comprising:
   a correction data memory for storing correction data for correcting a display state of an image on a cathode ray tube, obtained on the basis of an image displayed on a screen of the cathode ray tube; and
   calculating means for executing an operation of correcting image data by temporarily and spatially changing the image data by pixel in one frame on the basis of the correction data stored in the correction data memory so that an image is properly displayed according to characteristics of the cathode ray tube and outputting the corrected image data as image data for display on the cathode ray tube.

2. An image display correcting apparatus according to claim 1, wherein the correction data is data related to a movement amount from a proper display position of each pixel in two-dimensional digitized image data showing an image displayed on the screen of the cathode ray tube, and
   a value of each pixel in said corrected image data is calculated by using a value of a pixel in a position deviated only by the movement amount in the image data which has not been corrected.

3. An image display correcting apparatus according to claim 2, wherein the value of the pixel in a position deviated only by the movement amount is obtained by estimation of linear interpolation from four pixels existing near the position deviated only by the movement amount.

4. An image display correcting apparatus according to claim 2, wherein the movement amount is comprised of an integer part and a decimal fraction part,
   a plurality of pixels in uncorrected image data are selected on the basis of the integer part of the movement amount in order to calculate one pixel value in the corrected image data, and
   a calculation value to calculate the one pixel value for the selected pixels is determined on the basis of the decimal fraction part of the movement amount.

5. An image display correcting apparatus according to claim 1, wherein the correction data is data related to a movement amount from a proper display position in each of a plurality of representative pixels in digitized two-dimensional image data showing an image displayed on the screen of the cathode ray tube,
   a pixel value of each of the representative pixels in the corrected image data is calculated by using a value of a pixel in a position deviated only by the movement amount from the representative pixel in the uncorrected image data, and
   a pixel value of each of the other pixels than the representative pixels in the corrected image data is calculated by using a value of a pixel in a position deviated only by the movement amount from a proper display position obtained by estimation based on the movement amount of the representative pixel in the uncorrected image data.

6. An image display correcting apparatus according to claim 5, wherein the movement amount of the representative pixel includes an integer part and a decimal fraction part, a plurality of pixels in uncorrected image data are selected on the basis of the integer part of the movement amount in order to calculate one of the representative pixels in the corrected image data, and a calculation value to calculate the one pixel value for the selected pixels is determined on the basis of the decimal fraction part of the movement amount.

7. An image display correcting apparatus according to claim 5, wherein the representative pixels are arranged in a grid in the two-dimensional image data.

8. An image display correcting apparatus according to claim 5, wherein with respect to the movement amounts of the other pixels than the representative pixels, the movement amount of each of the pixels in a peripheral region of a screen is obtained by estimation of extrapolating the movement amounts of the representative pixels and the movement amount of each of the pixels in the region of the screen is obtained by estimation by interpolating the movement amounts of the representative pixels.

9. An image display correcting method comprising:

storing correction data for correcting a display state of an image on a cathode ray tube, obtained based on an image displayed on a screen of the cathode ray tube; and executing an operation of correcting image data by temporally and spatially changing the image data by pixel in one frame on the basis of the correction data stored in the storing step so that the image is properly displayed according to characteristics of the cathode ray tube and outputting corrected image data as image data for display on the cathode ray tube.

10. An image display apparatus comprising:

a cathode ray tube for displaying an image on the basis of inputted video signals for display;

a correction data memory for storing correction data for correcting a display state of an image on a cathode ray tube, obtained based on an image displayed on a screen;

calculating means for executing an operation of correcting image data by temporally and spatially changing the image data by pixel in one frame on the basis of the correction data stored in the correction data memory so that an image is properly displayed according to characteristics of the cathode ray tube and outputting the corrected image data for display on the cathode ray tube; and image display means for displaying an image on the basis of the image data for display outputted from the calculating means.

11. An image display apparatus comprising:

an A/D converter for converting inputted analog component video signals of a plurality of colors into digital signals color by color and outputting the digital signals;

a frame memory for storing the digital signals outputted from the A/D converter color by color on a frame unit basis;

a correction write address generating unit for controlling an address position on the frame memory when the image data outputted from the A/D converter is stored into the frame memory;

a timing generator for controlling the timing of the writing control executed by the correction write address generating unit;

a read address generator for generating an address signal to read the data stored in the frame memory;

a D/A converter for converting the digital signal for each color read from the frame memory into an analog signal and outputting the analog signal to a CRT; and a correction data memory for storing image distortion correcting data, wherein the correction write address generating unit controls an address position on the frame memory on the basis of the image distortion correcting data stored in the correction data memory so that image data supplied to the CRT is rearranged in each color and written, and the image data stored in the frame memory is sequentially read in accordance with an address signal generated by the read address generator, thereby an image which is not distorted is displayed.

12. An image display apparatus according to claim 11, further comprising:

an image pickup apparatus for obtaining a reference image displayed on the CRT;

a frame memory for a reference image for storing reference image data obtained by the image pickup apparatus; and an image distortion data calculating unit, when an image displayed on the CRT varies and a distorted image is displayed, for determining to which position on the frame memory for reference image the position of each pixel in the distorted image corresponds, forming correction data from data related to address information both in the display image on the CRT and in the frame memory for reference image, and storing the correction data into the correction data memory.

13. An image display method comprising:

a step of storing correction data for correcting a display state of an image on a cathode ray tube, obtained based on an image displayed on a screen of the cathode ray tube;

a step of executing an operation of correcting image data by temporally and spatially changing the image data by pixel in one frame on the basis of the correction data stored in the storing step so that an image is properly displayed according to characteristics of the cathode ray tube and outputting the corrected image data as image data for display on the cathode ray tube; and a step of displaying an image on the cathode ray tube on the basis of the image data for display outputted in the calculating step.

14. An image display correcting system comprising:

a cathode ray tube for displaying an image on the basis of inputted video signals for display and a correction data forming apparatus for forming correction data for correcting an image displayed on the cathode ray tube, wherein the correction data forming apparatus includes: an image pickup device for obtaining an image displayed on a screen of the cathode ray tube; and a correction data calculating unit for forming correction data to correct a display state of an image on the basis of the image obtained by the image pickup apparatus, and the cathode ray tube, includes: a correction data memory for storing correction data formed by the correction data forming apparatus; calculating means for executing an operation of correcting inputted image data by temporally and spatially changing the image data by pixel in one frame on the basis of the correction data stored in the correction data memory so that an image is properly displayed according to characteristics of the cathode ray tube and outputting the corrected image data as image data for display.

15. An image display correcting apparatus comprising:
a correction data memory for storing correction data for correcting a display state of an image, obtained on the basis of an image displayed on a screen; and
calculating means for performing an operation of correcting inputted image data on the basis of the correction data stored in the correction data memory so that an image is properly displayed and outputting the corrected image data as image data for display, wherein
the correction data is data related to a movement amount from a proper display position of each pixel in two-dimensional digitized image data showing an image displayed on the screen,
a value of each pixel in the corrected image data is calculated by using a value of a pixel in a position deviated only by the movement amount in the image data which has not been corrected, and
the value of the pixel in a position deviated only by the movement amount is obtained by estimation of linear interpolation from four pixels existing near the position deviated only by the movement amount.

16. An image display correcting apparatus comprising:
a correction data memory for storing correction data for correcting a display state of an image, obtained on the basis of an image displayed on a screen; and
calculating means for performing an operation of correcting inputted image data on the basis of the correction data stored in the correction data memory so that an image is properly displayed and outputting the corrected image data as image data for display, wherein
the correction data is data related to a movement amount from a proper display position of each pixel in two-dimensional digitized image data showing an image displayed on the screen,
a value of each pixel in the corrected image data is calculated by using a value of a pixel in a position deviated only by the movement amount in the image data which has not been corrected,
the movement amount is comprised of an integer part and a decimal fraction part,
a plurality of pixels in uncorrected image data are selected on the basis of the integer part of the movement amount in order to calculate one pixel value in the corrected image data, and
a calculation value to calculate the one pixel value for the selected pixels is determined on the basis of the decimal fraction part of the movement amount.

17. An image display correcting apparatus comprising:
a correction data memory for storing correction data for correcting a display state of an image, obtained on the basis of an image displayed on a screen; and
calculating means for performing an operation of correcting inputted image data on the basis of the correction data stored in the correction data memory so that an image is properly displayed and outputting the corrected image data as image data for display, wherein
the correction data is data related to a movement amount from a proper display position in each of a plurality of representative pixels in digitized two-dimensional image data showing an image displayed on the screen,
a pixel value of each of the representative pixels in the corrected image data is calculated by using a value of a pixel in a position deviated only by the movement amount from the representative pixel in the uncorrected image data,
a pixel value of each of the other pixels than the representative pixels in the corrected image data is calculated by using a value of a pixel in a position deviated only by the movement amount from a proper display position obtained by estimation based on the movement amount of the representative pixel in the uncorrected image data,
the movement amount of the representative pixel includes an integer part and a decimal fraction part,
a plurality of pixels in uncorrected image data are selected on the basis of the integer part of the movement amount in order to calculate one of the representative pixels in the corrected image data, and
a calculation value to calculate the one pixel value for the selected pixels is determined on the basis of the decimal fraction part of the movement amount.

18. An image display correcting apparatus comprising:
a correction data memory for storing correction data for correcting a display state of an image, obtained on the basis of an image displayed on a screen; and
calculating means for performing an operation of correcting inputted image data on the basis of the correction data stored in the correction data memory so that an image is properly displayed and outputting the corrected image data as image data for display, wherein
the correction data is data related to a movement amount from a proper display position in each of a plurality of representative pixels in digitized two-dimensional image data showing an image displayed on the screen,
a pixel value of each of the representative pixels in the corrected image data is calculated by using a value of a pixel in a position deviated only by the movement amount from the representative pixel in the uncorrected image data, and
a pixel value of each of the other pixels than the representative pixels in the corrected image data is calculated by using a value of a pixel in a position deviated only by the movement amount from a proper display position obtained by estimation based on the movement amount of the representative pixel in the uncorrected image data,
with respect to the movement amounts of the other pixels than the representative pixels, the movement amount of each of the pixels in a peripheral region of a screen is obtained by estimation of extrapolating the movement amounts of the representative pixels and the movement amount of each of the pixels in the region of the screen is obtained by estimation by interpolating the movement amounts of the representative pixels.

19. An image display apparatus comprising:
an A/D converter for converting inputted analog component video signals of a plurality of colors into digital signals color by color and outputting the digital signals;
a frame memory for storing the digital signals outputted from the A/D converter color by color on a frame unit basis;
a correction write address generating unit for controlling an address position on the frame memory when the image data outputted from the A/D converter is stored into the frame memory;
a timing generator for controlling the timing of the writing control executed by the correction write address generating unit;
a read address generator for generating an address signal to read the data stored in the frame memory;

a D/A converter for converting the digital signal for each color read from the frame memory into an analog signal and outputting the analog signal to a CRT; and a correction data memory for storing image distortion correcting data, wherein the correction write address generating unit controls an address position on the frame memory on the basis of the image distortion correcting data stored in the correction data memory so that image data supplied to the CRT is rearranged in each color and written, and the image data stored in the frame memory is sequentially read in accordance with an address signal generated by the read address generator, thereby an image which is not distorted is displayed.

20. An image display apparatus according to claim 19, further comprising:

an image pickup apparatus for obtaining a reference image displayed on the CRT;

a frame memory for a reference image for storing reference image data obtained by the image pickup apparatus; and an image distortion data calculating unit, when an image displayed on the CRT varies and a distorted image is displayed, for determining to which position on the frame memory for reference image the position of each pixel in the distorted image corresponds, forming correction data from data related to address information both in the display image on the CRT and in the frame memory for reference image, and storing the correction data into the correction data memory.

* * * * *